(12) United States Patent
Wang et al.

(10) Patent No.: US 10,958,322 B2
(45) Date of Patent: Mar. 23, 2021

(54) ANTENNA APPARATUS AND BEAM STATE SWITCHING METHOD

(71) Applicant: HUAWEI TECHNOLOGIES CO., LTD., Guangdong (CN)

(72) Inventors: Linlin Wang, Xi'an (CN); Weihong Xiao, Dongguan (CN); Chaohui Yang, Xi'an (CN); Jian Qin, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/910,922

(22) Filed: Jun. 24, 2020

(65) Prior Publication Data
US 2020/0328787 A1    Oct. 15, 2020

Related U.S. Application Data

(63) Continuation of application No. PCT/CN2018/123113, filed on Dec. 24, 2018.

(30) Foreign Application Priority Data

Dec. 27, 2017 (CN) .......................... 201711448886.6

(51) Int. Cl.
*H04B 7/06* (2006.01)
*H01Q 21/00* (2006.01)
(Continued)

(52) U.S. Cl.
CPC ....... *H04B 7/0602* (2013.01); *H01Q 21/0006* (2013.01); *H04B 7/0408* (2013.01); *H04B 7/0413* (2013.01)

(58) Field of Classification Search
CPC ...... H04B 7/0602; H04B 7/0413; H04B 7/06; H01Q 21/0006; H01Q 1/50; H01Q 21/00
See application file for complete search history.

(56) References Cited

U.S. PATENT DOCUMENTS

2010/0117913 A1    5/2010 Jung
2015/0119052 A1    4/2015 Caimi et al.
(Continued)

FOREIGN PATENT DOCUMENTS

CN    102361173 A    2/2012
CN    103095353 A    5/2013
(Continued)

OTHER PUBLICATIONS

Office Action issued in Chinese Application No. 201711448886.6 dated Jun. 29, 2020, 5 pages.
(Continued)

*Primary Examiner* — Dac V Ha
(74) *Attorney, Agent, or Firm* — Fish & Richardson P.C.

(57) ABSTRACT

One example antenna apparatus includes S groups of antenna bays, S groups of phase-shift feeding networks, and S beamforming networks. An $i^{th}$ group of antenna bays include $N_i$ bays, an $i^{th}$ group of phase-shift feeding networks include $N_i$ phase-shift feeding networks, and the $N_i$ bays are connected to the $N_i$ phase-shift feeding networks. In a first state, an $i^{th}$ beamforming network is configured to form $n_i$ beams corresponding to the $N_i$ bays, where $N_i$ first ports corresponding to the beamforming network are connected to the $N_i$ phase-shift feeding networks, $n_i$ second ports corresponding to the beamforming network are connected to $n_i$ antenna ports, and $n_i$ is less than $N_i$. In a second state, an $i^{th}$ beamforming network is configured to form $N_i$ beams corresponding to the $N_i$ bays, where $N_i$ first ports corresponding to the beamforming network are connected to the $N_i$ phase-shift feeding networks, and $N_i$ second ports corresponding to the beamforming network are connected to $N_i$ antenna ports.

16 Claims, 12 Drawing Sheets

(51) Int. Cl.
   *H04B 7/0408*   (2017.01)
   *H04B 7/0413*   (2017.01)

(56) References Cited

U.S. PATENT DOCUMENTS

| | | | |
|---|---|---|---|
| 2017/0366242 A1 | 12/2017 | Lee et al. | |
| 2018/0220406 A1* | 8/2018 | Mizusawa | H04B 7/04 |
| 2019/0020123 A1* | 1/2019 | Petersson | H04B 7/0469 |
| 2019/0028167 A1* | 1/2019 | Chang | H04B 7/0413 |
| 2019/0103665 A1* | 4/2019 | Yoo | H01Q 1/36 |
| 2019/0319680 A1* | 10/2019 | Zhang | H04B 7/0617 |
| 2020/0044345 A1* | 2/2020 | Zimmerman | H01Q 3/40 |

FOREIGN PATENT DOCUMENTS

| | | | |
|---|---|---|---|
| CN | 106848579 A | 6/2017 | |
| EP | 3214772 A1 | 9/2017 | |
| WO | 2012159345 A1 | 11/2012 | |

OTHER PUBLICATIONS

Extended European Search Report issued in European Application No. 18896947.1 dated Dec. 22, 2020, 15 pages.

* cited by examiner

ANTENNA APPARATUS AND BEAM STATE SWITCHING METHOD

CROSS-REFERENCE TO RELATED APPLICATIONS

This application is a continuation of International Application No. PCT/CN2018/123113, filed on Dec. 24, 2018, which claims priority to Chinese Patent Application No. 201711448886.6, filed on Dec. 27, 2017. The disclosures of the aforementioned applications are hereby incorporated by reference in their entireties.

TECHNICAL FIELD

This application relates to the field of communications technologies, and in particular, to an antenna apparatus and a beam state switching method.

BACKGROUND

A smart antenna is also referred to as an adaptive array antenna, including three parts: an antenna, array, a beamforming network, and a beamforming algorithm. The smart antenna adjusts a weighted amplitude and phase of each array element signal by using an algorithm that meets a criterion, to adjust a shape of a directivity pattern of the antenna array to strengthen a required signal and suppress an interference signal. A smart antenna technology is applicable to a CDMA system that uses time division duplex (TDD), and can suppress multi-user interference and increase a system capacity to a relatively large extent.

In the prior art, in a scenario of capacity expansion for a TDD smart antenna, a three-dimensional multi-beam antenna technology or a massive MIMO (MM) technology is usually used. In the three-dimensional multi-beam antenna technology, an antenna directivity pattern of a three-sector coverage network of a wireless cellular system is divided into a plurality of parts, including several parts in a horizontal dimension and several parts in a vertical dimension. The MM is an advanced form developed from a multi-antenna technology, and is a key technology of a 4.5G network. A quantity of radio frequency channels and a quantity of antennas are significantly increased at an MM site, and the antenna and a radio frequency unit are integrated into an active antenna unit (AAU). Compared with the traditional multi-antenna technology, the MM can significantly improve performance of a single-user link and a multi-user space division multiplexing capability by using a massive antenna array to jointly receive, demodulate, or send a signal, thereby significantly improving quality and a transmission rate of a system link. In addition, in the MM system, a degree of freedom in the vertical dimension is increased, and shapes of beams in the horizontal dimension and in the vertical dimension can be flexibly adjusted. Therefore, a three-dimensional coverage capability of a base station is significantly improved.

The two technologies have respective advantages and disadvantages in terms of costs, performance, and technology maturity, and are used in different scenarios. For example, the three-dimensional multi-beam technology is applicable to a small-packet service scenario in which users are evenly distributed, and the MM may be applicable to a large-packet service scenario. However, the MM has a large quantity of channels and high costs, and has a low performance gain in the small-packet service. How to implement smooth evolution while both features are supported has become a concern of operators.

SUMMARY

Embodiments of this application provide an antenna apparatus and a beam state switching method, to perform state switching based on a service scenario, and applicable to a plurality of service scenarios.

In view of this, a first aspect of this application provides an antenna apparatus. The antenna apparatus includes S groups of antenna bays, S groups of phase-shift feeding networks, and S beamforming networks, where S is an integer greater than or equal to 1;

an $i^{th}$ group of antenna bays in M groups of antenna bays include $N_i$ bays, an $i^{th}$ group of phase-shift feeding networks in M groups of phase-shift feeding networks include $N_i$ phase-shift feeding networks, and the $N_i$ bays are connected to the $N_i$ phase-shift feeding networks in a one-to-one correspondence, where M is an integer less than or equal to S, i is any integer from 1 to M, and $N_i$ is an integer greater than 1; and when the antenna apparatus is in a first state, an $i^{th}$ beamforming network in M beamforming networks is configured to form $n_i$ beams corresponding to the $N_i$ bays, $N_i$ first ports corresponding to the $i^{th}$ beamforming network are connected to the $N_i$ phase-shift feeding networks in a one-to-one correspondence, and $n_i$ second ports corresponding to the $i^{th}$ beamforming network are connected to $n_i$ antenna ports in a one-to-one correspondence, where $n_i$ is an integer less than or equal to $N_i$; or when the antenna apparatus is in a second state, an $i^{th}$ beamforming network in M beamforming networks is configured to form $N_i$ beams corresponding to the $N_i$ bays, $N_i$ first ports corresponding to the beamforming network are connected to the $N_i$ phase-shift feeding networks in a one-to-one correspondence, and $N_i$ second ports corresponding to the $i^{th}$ beamforming network are connected to $N_i$ antenna ports in a one-to-one correspondence.

The antenna apparatus in this implementation may be flexibly switched between a multi-beam antenna state and an MM state based on a service requirement. For example, in a small-packet service scenario, the antenna apparatus may be used as a multi-beam antenna to save resources. In a scenario in which users are not evenly distributed, the antenna apparatus may be used as an MM. In other words, the antenna apparatus in this application may be applicable to a plurality of service scenarios, and has high flexibility.

With reference to the first aspect of this application, in a first implementation of the first aspect of this application, the antenna apparatus further includes L antenna ports, a port correction network corresponding to the L antenna ports, and a correction port.

L is greater than or equal to 1. For example, L may be equal to a total quantity of bays included in the S groups of antenna bays.

The port correction network is configured to couple signals corresponding to the L antenna ports to the correction port.

In this implementation, the port correction network may couple all signals of the antenna ports to the correction port, to provide a correction port for a radio frequency system, and provide a condition for the radio frequency system to perform signal correction.

With reference to the first implementation of the first aspect of this application, in a second implementation of the first aspect of this application, when the antenna apparatus is in the second state, the correction port is connected to a port corresponding to a correction module in the radio frequency system, so that the correction module corrects signals corresponding to the L antenna ports.

In this implementation, when the antenna apparatus is in the MM state, the radio frequency system may correct, based on the signals coupled to the correction port, a signal transmitted between the radio frequency system and an antenna port, so that the antenna apparatus can transmit or receive a more accurate signal.

With reference to the first implementation of the first aspect of this application, in a third implementation of the first aspect of this application, when the antenna apparatus is in the first state, the correction port is connected to a port corresponding to a correction module in the radio frequency system, so that the correction module corrects signals corresponding to the L antenna ports.

In this implementation, when the antenna apparatus is in the MM state, the radio frequency system may correct, based on the signals coupled to the correction port, a signal transmitted between the radio frequency system and an antenna port, so that the antenna apparatus can transmit or receive a more accurate signal.

With reference to any one of the first aspect of this application and the first implementation to the third implementation of the first aspect, in a fourth implementation of the first aspect of this application, the $i^{th}$ beamforming network includes an $n_i$-driving-$N_i$ multi-beam feeding network, an $N_i$-driving-$N_i$ through feeding network, $N_i$ first switch circuits, and $N_i$ second switch circuits.

When the antenna apparatus is in the first state, the $N_i$ phase-shift feeding networks are connected, in a one-to-one correspondence, to $N_i$ first ports corresponding to the $N_i$ first switch circuits, $N_i$ second ports corresponding to the $N_i$ first switch circuits are connected, in a one-to-one correspondence, to $N_i$ first ports corresponding to the $n_i$-driving-$N_i$ multi-beam feeding network, $n_i$ second ports corresponding to the $n_i$-driving-$N_i$ multi-beam feeding network are connected, in a one-to-one correspondence, to $n_i$ first ports corresponding to $n_i$ second switch circuits, and $n_i$ second ports corresponding to the $n_i$ second switch circuits are connected to $n_i$ antenna ports in a one-to-one correspondence, where the $n_i$-driving-$N_i$ multi-beam feeding network is configured to form $n_i$ beams corresponding to the $N_i$ bays. Optionally, the $n_i$ beams may be orthogonal beams.

When the antenna apparatus is in the second state, the $N_i$ phase-shift feeding networks are connected, in a one-to-one correspondence, to $N_i$ first ports corresponding to the $N_i$ first switch circuits, $N_i$ second ports corresponding to the $N_i$ first switch circuits are connected, in a one-to-one correspondence, to $N_i$ first ports corresponding to the $N_i$-driving-$N_i$ through feeding network, $N_i$ second ports corresponding to the $N_i$-driving-$N_i$ through feeding network are connected, in a one-to-one correspondence, to $N_i$ first ports corresponding to the $N_i$ second switch circuits, $N_i$ second ports corresponding to the $N_i$ second switch circuits are connected to the $N_i$ antenna ports in a one-to-one correspondence, and the $N_i$ antenna ports are connected to the port correction network, where the $N_i$-driving-$N_i$ through feeding network is configured to form $N_i$ beams corresponding to the $N_i$ bays. Optionally, the $N_i$ beams may be through beams.

In this implementation, the beamforming network may be switched to different networks by using switches, thereby implementing state switching of the antenna apparatus. The switches have low costs and high flexibility.

With reference to the fourth implementation of the first aspect of this application, in a fifth implementation of the first aspect of this application, the $N_i$-driving-$N_i$ through feeding network is bypassed to the $n_i$-driving-$N_i$ multi-beam feeding network.

In this implementation, the multi-beam feeding network is bypassed to the through feeding network. The design is simple and costs are low.

With reference to the fourth implementation of the first aspect of this application, in a sixth implementation of the first aspect of this application, S is greater than or equal to 2, a $j^{th}$ group of antenna bays in the S groups of antenna bays include $N_j$ bays, a $j^{th}$ group of phase-shift feeding networks include $N_j$ phase-shift feeding networks, and the $N_j$ bays are connected to the $N_j$ phase-shift feeding networks in a one-to-one correspondence, where $N_j$ is an integer greater than or equal to 1;

the $i^{th}$ group of phase-shift feeding networks are configured to control downtilt angles of beams corresponding to the $i^{th}$ group of antenna bays, where a downtilt angle of a beam corresponding to each bay in the $i^{th}$ group of antenna bays is within a first preset range;

the $j^{th}$ group of phase-shift feeding networks are configured to control downtilt angles of beams corresponding to the $j^{th}$ group of antenna bays, where a downtilt angle of a beam corresponding to each bay in the $j^{th}$ group of antenna bays is within a second preset range; and the downtilt angle is an azimuth angle or a pitch angle.

In this implementation, downtilt angles of beams corresponding to antenna bays in a same group are within a preset range, so that energy is more concentrated, and the antenna apparatus can better transmit and receive a signal.

With reference to the sixth implementation of the first aspect of this application, in a seventh implementation of the first aspect of this application, when the antenna apparatus is in the first state, $|\overline{ET_i}-\overline{ET_j}|>(d_i+d_j)/2$, where $\overline{ET_i}$ is an average value of downtilt angles of beams corresponding to the $N_i$ bays in the $i^{th}$ group of antenna bays, $\overline{ET_j}$ is an average value of downtilt angles of beams corresponding to the $N_j$ bays in the $j^{th}$ group of antenna bays, $d_i$ is an average beam width of $n_i$ orthogonal beams corresponding to the $i^{th}$ group of antenna bays, and $d_j$ is an average beam width of the beams corresponding to the $j^{th}$ group of antenna bays.

In this implementation, a difference between the downtilt angles corresponding to the two groups of antenna bays is greater than the average beam width of the beams corresponding to the two groups of antenna bays, so that the antenna apparatus can be in the three-dimensional multi-beam state, and mutual interference between the beams corresponding to the two groups of antenna bays can be avoided.

With reference to the sixth implementation of the first aspect of this application, in an eighth implementation of the first aspect of this application, when the antenna apparatus is in the second state, $\overline{ET_i}=\overline{ET_j}$, where $\overline{ET_i}$ is an average value of downtilt angles of beams corresponding to the $N_i$ bays in the $i^{th}$ group of antenna bays, and $\overline{ET_j}$ is an average value of downtilt angles of beams corresponding to the $N_j$ bays in the $j^{th}$ group of antenna bays.

In this implementation, when the antenna apparatus is in the MM state, the downtilt angles corresponding to the two groups of antenna bays are equal, so that the beams corresponding to the two groups of antenna bays can be in a same direction and jointly form a larger array, thereby improving performance of the antenna apparatus.

A second aspect of this application provides a beam state switching method. The method is applied to an antenna apparatus, and the antenna apparatus includes S groups of antenna bays, S groups of phase-shift feeding networks, and S beamforming networks, where S is an integer greater than or equal to 1;

an $i^{th}$ group of antenna bays in M groups of antenna bays include $N_i$ bays, an $i^{th}$ group of phase-shift feeding networks in M groups of phase-shift feeding networks include $N_i$ phase-shift feeding networks, and the $N_i$ bays are connected to the $N_i$ phase-shift feeding networks in a one-to-one correspondence, where M is an integer less than or equal to S, i is any integer from 1 to M, and $N_i$ is an integer greater than or equal to 1; and when the antenna apparatus is in a first state, an $i^{th}$ beamforming network in M beamforming networks is configured to form $n_i$ beams corresponding to the $N_i$ bays, $N_i$ first ports corresponding to the $i^{th}$ beamforming network are connected to the $N_i$ phase-shift feeding networks in a one-to-one correspondence, and $n_i$ second ports corresponding to the $i^{th}$ beamforming network are connected to $n_i$ antenna ports in a one-to-one correspondence, where $n_i$ is an integer less than or equal to $N_i$; or when the antenna apparatus is in a second state, an $i^{th}$ beamforming network in M beamforming networks is configured to form $N_i$ beams corresponding to the $N_i$ bays, $N_i$ first ports corresponding to the $i^{th}$ beamforming network are connected to the $N_i$ phase-shift feeding networks in a one-to-one correspondence, and $N_i$ second ports corresponding to the $i^{th}$ beamforming network are connected to $N_i$ antenna ports in a one-to-one correspondence.

The method includes: receiving, by a control apparatus, a switching instruction; and switching, based on the switching instruction, the antenna apparatus from the first state to the second state, or switching the antenna apparatus from the second state to the first state, where the first state is a multi-beam antenna state, and the second state is a massive MIMO MM state.

With reference to the second aspect of this application, in a first implementation of the second aspect of this application, the antenna apparatus further includes L antenna ports, a port correction network corresponding to the L antenna ports, and a correction port.

L is greater than or equal to 1. For example, L may be equal to a total quantity of bays included in the S groups of antenna bays.

The port correction network is configured to couple signals corresponding to the L antenna ports to the correction port.

With reference to the first implementation of the second aspect of this application, in a second implementation of the second aspect of this application, when the antenna apparatus is in the second state, the correction port is connected to a port corresponding to a correction module in a radio frequency system, so that the correction module corrects signals corresponding to the L antenna ports; or when the antenna apparatus is in the first state, the correction port is connected to a port corresponding to a correction module in a radio frequency system, so that the correction module corrects signals corresponding to the L antenna ports.

With reference to the second aspect of this application, and the first implementation or the second implementation of the second aspect, in a third implementation of the second aspect of this application, the $i^{th}$ beamforming network includes an $n_i$-driving-$N_i$ multi-beam feeding network, an $N_i$-driving-$N_i$ through feeding network, $N_i$ first switch circuits, and $N_i$ second switch circuits;

the $N_i$ phase-shift feeding networks are connected, in a one-to-one correspondence, to $N_i$ first ports corresponding to the $N_i$ first switch circuits;

the control apparatus may switch the antenna apparatus from the second state to the first state in the following manner:

controlling, by the control apparatus based on the switching instruction, the $N_i$ first switch circuits and $n_i$ second switch circuits in the $N_i$ second switch circuits, so that $N_i$ second ports corresponding to the $N_i$ first switch circuits are connected, in a one-to-one correspondence, to $N_i$ first ports corresponding to the $n_i$-driving-$N_i$ multi-beam feeding network, $n_i$ first ports corresponding to the $n_i$ second switch circuits are connected, in a one-to-one correspondence, to $n_i$ second ports corresponding to the $n_i$-driving-$N_i$ multi-beam feeding network, and $n_i$ second ports corresponding to the $n_i$ second switch circuits are connected to $n_i$ antenna ports in a one-to-one correspondence; and the control apparatus may switch the antenna apparatus from the first state to the second state in the following manner:

controlling, by the control apparatus based on the switching instruction, the $N_i$ first switch circuits and the $N_i$ second switch circuits, so that $N_i$ second ports corresponding to the $N_i$ first switch circuits are connected, in a one-to-one correspondence, to $N_i$ first ports corresponding to the $N_i$-driving-$N_i$ through feeding network, $N_i$ first ports corresponding to the $N_i$ second switch circuits are connected, in a one-to-one correspondence, to $N_i$ second ports corresponding to the $N_i$-driving-$N_i$ through feeding network, $N_i$ second ports corresponding to the $N_i$ second switch circuits are connected to $N_i$ antenna ports in a one-to-one correspondence, and the $N_i$ antenna ports are connected to the port correction network.

In this implementation, the control apparatus may switch the state of the antenna apparatus by using switches. The operation is simple, convenient, and fast.

With reference to any one of the second aspect of this application and the first implementation to the third implementation of the second aspect, in a fourth implementation of the second aspect of this application, S is greater than or equal to 2;

a $j^{th}$ group of antenna bays in the S groups of antenna bays include $N_j$ bays, a $j^{th}$ group of phase-shift feeding networks include $N_j$ phase-shift feeding networks, and the $N_j$ bays are connected to the $N_j$ phase-shift feeding networks in a one-to-one correspondence, where $N_j$ is an integer greater than or equal to 1; and a process of switching, by the control apparatus, the antenna apparatus from the first state to the second state may include:

controlling, by the control apparatus, the $N_i$ phase-shift feeding networks in the $i^{th}$ group of phase-shift feeding networks and the $N_j$ phase-shift feeding networks in the $j^{th}$ group of phase-shift feeding networks, so that a downtilt angle of a beam corresponding to each bay in the $i^{th}$ group of antenna bays is within a first preset range, and a downtilt angle of a beam corresponding to each bay in the $j^{th}$ group of antenna bays is within a second preset range; and $\overline{ET_i}=\overline{ET_j}$, were $\overline{ET_i}$ is an average value of downtilt angles of beams corresponding to the $N_i$ bays in the $i^{th}$ group of antenna bays, and $\overline{ET_j}$ is an average value of downtilt angles of beams corresponding to the $N_j$ bays in the $j^{th}$ group of antenna bays.

In this implementation, when switching the antenna apparatus from the first state to the second state, the control apparatus may further control, by using the phase-shift feeding network, the downtilt angles of the beams corresponding to the antenna bays, so that the downtilt angles of the beams corresponding to the two groups of bays are equal. Therefore, the beams corresponding to the two groups of antenna bays can be in a same direction and jointly form a larger array, thereby improving performance of the antenna apparatus.

With reference to the second aspect of this application and the first implementation to the fourth implementation of the second aspect, in a fifth implementation of the second aspect of this application, the first state is a three-dimensional multi-beam antenna state, and S is greater than or equal to 2;

a $j^{th}$ group of antenna bays in the S groups of antenna bays include $N_j$ bays, a $j^{th}$ group of phase-shift feeding networks include $N_j$ phase-shift feeding networks, and the $N_j$ bays are connected to the $N_j$ phase-shift feeding networks in a one-to-one correspondence, where $N_j$ is an integer greater than or equal to 1; and a process of switching, by the control apparatus, the beam state corresponding to the antenna apparatus from the second state to the first state may include:

controlling, by the control apparatus, the $N_i$ phase-shift feeding networks in the $i^{th}$ group of phase-shift feeding networks and the $N_j$ phase-shift feeding networks in the $j^{th}$ group of phase-shift feeding networks, so that a downtilt angle of a beam corresponding to each bay in the $i^{th}$ group of antenna bays is within a first preset range, and a downtilt angle of a beam corresponding to each bay in the $j^{th}$ group of antenna bays is within a second preset range; and $|\overline{ET_i} - \overline{ET_j}| > (d_i + d_j)/2$, where $\overline{ET_i}$ is an average value of downtilt angles of beams corresponding to the $N_i$ bays in the $i^{th}$ group of antenna bays, and $\overline{ET_j}$ is an average value of downtilt angles of beams corresponding to the $N_j$ bays in the $j^{th}$ group of antenna bays, $d_i$ is an average beam width of $n_i$ orthogonal beams corresponding to the $i^{th}$ group of antenna bays, $d_j$ is an average beam width of beams corresponding to the $j^{th}$ group of antenna bays, and the downtilt angle is an azimuth angle or a pitch angle.

In this implementation, the control apparatus may control, by using the phase-shift feeding network, the downtilt angles of the beams corresponding to the antenna bays, so that a difference between the downtilt angles corresponding to the two groups of antenna bays is greater than the average beam width of the beams corresponding to the two groups of antenna bays. Therefore, the antenna apparatus can be in the three-dimensional multi-beam state, and mutual interference between beams corresponding to the two groups of antenna bays can be avoided.

A third aspect of this application provides a communications system. The communications system includes the antenna apparatus in any one of the first aspect and the first implementation to the eighth implementation of the first aspect.

It can be learned from the foregoing technical solutions that the embodiments of this application have the following advantages:

The antenna apparatus in the embodiments of this application includes S groups of antenna bays, S groups of phase-shift feeding networks, S beamforming networks, L antenna ports, and a port correction network corresponding to the L antenna ports. Each group of antenna bays may include a same quantity of bays or different quantities of bays. When the antenna apparatus is in a first state, at least one group of antenna bays can perform processing by using a corresponding beamforming network to obtain $n_i$ beams, $n_i$ is less than a quantity $N_i$ of bays included in the group of antenna bays. To be specific, the antenna apparatus can obtain, through combination, shaped beams that have a specific shape, that is, the antenna apparatus can be used as a multi-beam antenna. When the antenna apparatus is in a second state, the group of antenna bays may form, by using a corresponding beam processing network, $N_i$ beams corresponding to the quantity of bays included in the group of antenna bays. To be specific, the antenna apparatus can increase a quantity of radio frequency channels, and the antenna apparatus and a radio frequency unit may be integrated into an active antenna processing unit, and jointly receive, demodulate, or transmit a signal, that is, the antenna apparatus may be used as a massive MIMO. It can be learned that, the antenna apparatus in the embodiments of this application may be flexibly switched between a multi-beam antenna state and an MM state based on a service requirement. For example, in a small-packet service scenario, the antenna apparatus may be used as a multi-beam antenna to save resources. In a scenario in which users are not evenly distributed, the antenna apparatus may be used as an MM. In other words, the antenna apparatus in this application may be applicable to a plurality of service scenarios, and has high flexibility.

BRIEF DESCRIPTION OF DRAWINGS

To describe the technical solutions in embodiments of this application more clearly, the following briefly describes the accompanying drawings required for describing the embodiments. Apparently, the accompanying drawings in the following description show merely some embodiments of this application.

DESCRIPTION OF EMBODIMENTS

The following describes the technical solutions in embodiments of this application with reference to the accompanying drawings in the embodiments of this application. Apparently, the described embodiments are merely some rather than all of the embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented, for example, in orders except the order illustrated or described herein. Moreover, the terms "include", "have", or any other variant thereof are intended to cover non-exclusive inclusion.

The embodiments of this application provide an antenna apparatus and a beam state switching method, applicable to different service scenarios, thereby improving flexibility.

It should be understood that the technical solutions in the embodiments of this application may be applied to various communications systems, such as a global system for mobile communications (GSM) system, a code division multiple access (CDMA) system, a wideband code division multiple access (WCDMA) system, a general packet radio service (CPRS) system, a long term evolution (LTE) system, an LTE frequency division duplex (FDD) system, an LTE time division duplex (TDD) system a universal mobile telecommunications system (UMTS), a worldwide interoperability for microwave access (WiMAX) communications system, or a 5th-generation (5G) communications technology system. It should be noted that, the communications system is not specifically limited in the embodiments of this application.

Figure 1:
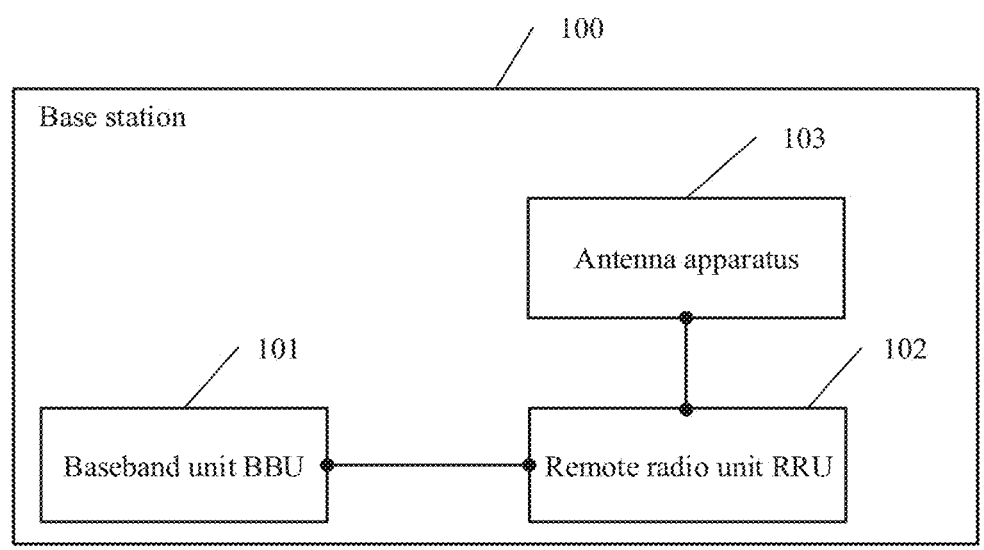
FIG. 1 is a schematic diagram of an embodiment of a base station system according to the embodiments of this application.

For ease of understanding, the following first describes a base station system that the antenna apparatus and the beam switching method in this application are applicable to. A base station (BS) may be a base transceiver station (BTS) in GSM or CDMA, or may be a NodeB in WCDMA, or may be an evolved Node B (eNB or e-NodeB) in LTE, or a base station in a 5G communications system or a subsequent evolved communications system. This is not limited in the embodiments of the present invention. The following uses FIG. 1 as an example to describe a base station system 100 that the antenna apparatus and the beam switching method in this application are applicable to. The base station system 100 includes a base band unit (BBU) 101, a radio remote unit (RRU) 102, and an antenna apparatus 103. The RRU is connected to the antenna apparatus, and the BBU is connected to the RRU.

It should be understood that in this application, a first port is opposite to a second port. The first port may be an input port or an output port. When the first port is an input port, the second port is an output port. When the first port is an output port, the second port is an input port. The following embodiments are described by using a case in which the first port is the input port and the second port is the output port.

Figure 2A:
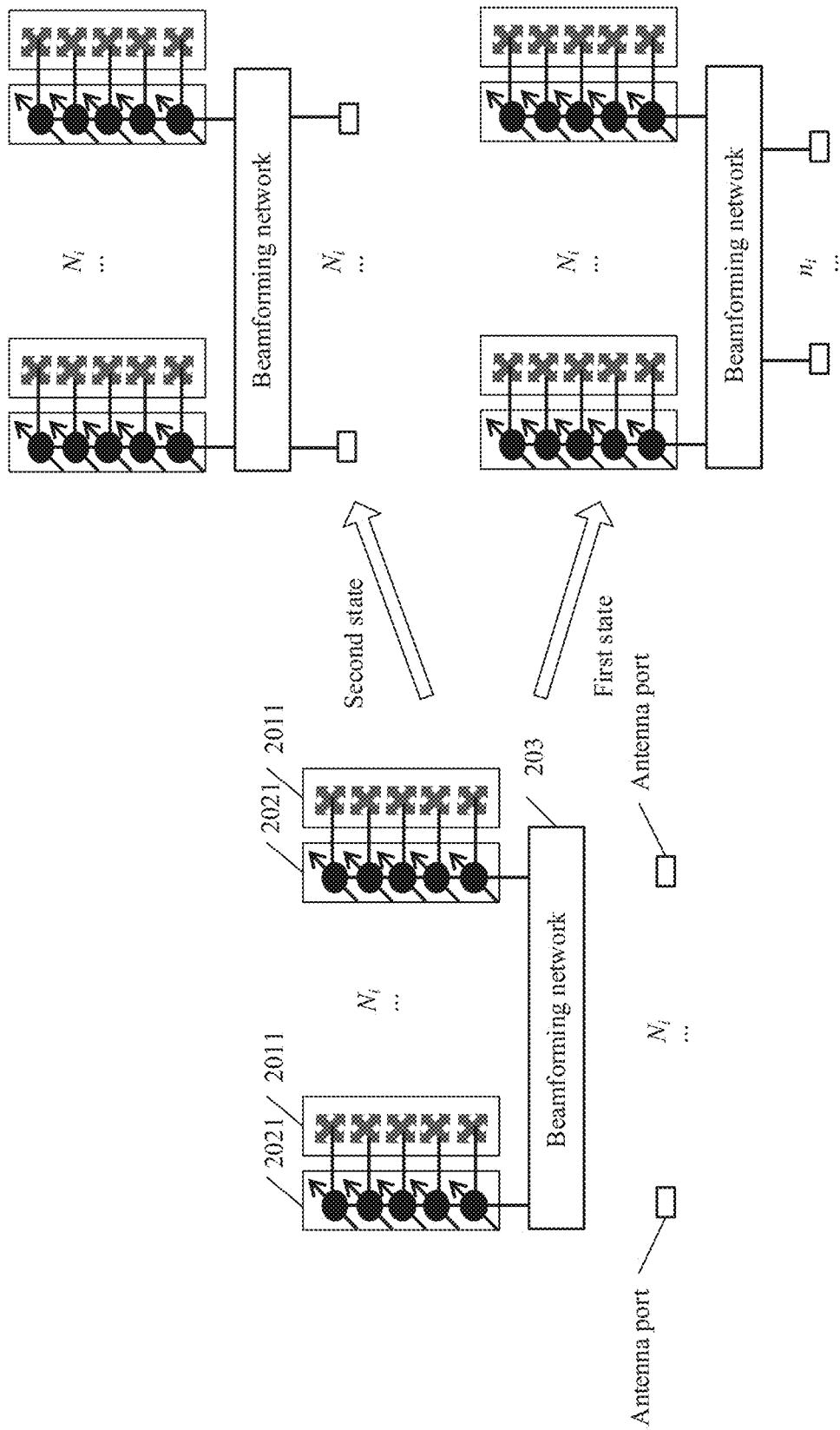
FIG. 2A is a schematic diagram of an embodiment of an antenna apparatus according to the embodiments of this application.

The following describes the antenna apparatus in the embodiments of this application. Referring to FIG. 2A, an embodiment of the antenna apparatus in the embodiments of this application includes S groups of antenna bays, S groups of phase-shift feeding networks, and S beamforming networks, where S is an integer greater than or equal to 1.

One group of antenna bays correspond to one group of phase-shift feeding networks and one beamforming network. Each group of antenna bays may have same or different compositions, each group of phase-shift feeding networks may have same or different compositions, and each beamforming network may have same or different compositions. This is not specifically limited in this application.

In the S beamforming networks, M beamforming networks form different beams when the antenna apparatus is in different states. The following describes the M beamforming networks, and M groups of antenna bays and M groups of phase-shift feeding networks that correspond to the M beamforming networks.

An $i^{th}$ group of antenna bays 201 in the M groups of antenna bays include $N_i$ bays 2011, an $i^{th}$ group of phase-shift feeding networks 202 in the M groups of phase-shift feeding networks include $N_i$ phase-shift feeding networks 2021, and the $N_i$ bays 2011 in the $i^{th}$ group of antenna bays are connected, in a one-to-one correspondence, to the $N_i$ phase-shift feeding networks 2021 in the $i^{th}$ group of phase-shift feeding networks, where $N_i$ is an integer greater than 1.

When the antenna apparatus is in a first state, an $i^{th}$ beamforming network 203 in the M beamforming networks is configured to form $n_i$ beams corresponding to the $N_i$ bays 2011 in the $i^{th}$ group of antenna bays 201. Specifically, $N_i$ input ports corresponding to the $i^{th}$ beamforming network 203 are connected, in a one-to-one correspondence, to the $N_i$ phase-shift feeding networks 2021 in the $i^{th}$ phase-shift feeding network 202, and $n_i$ output ports corresponding to the $i^{th}$ beamforming network 203 are connected to $n_i$ antenna ports in a one-to-one correspondence, where $n_i$ is an integer less than or equal to $N_i$.

When the antenna apparatus is in a second state, an $i^{th}$ beamforming network 203 in the M beamforming networks is configured to form $N_i$ beams corresponding to the $N_i$ bays 2011 in the $i^{th}$ group of antenna bays 201. Specifically, $N_i$ input ports corresponding to the $i^{th}$ beamforming network 203 are connected, in a one-to-one correspondence, to the $N_i$ phase-shift feeding networks 2021 in the $i^{th}$ phase-shift feeding network 202, and $N_i$ output ports corresponding to the $i^{th}$ beamforming network 203 are connected to $N_i$ antenna ports in a one-to-one correspondence.

It should be noted that FIG. 2A is only a schematic diagram of connections between one group of antenna bays, one group of phase-shift feeding networks, and one beamforming network. A quantity of elements included in each antenna bay, a quantity of phase-shift feeding networks, a placement position and a connection relationship of each physical device, and the like are merely used as an example, and do not constitute a limitation on this application.

In this application, M is an integer greater than 0 and less than S. To be specific, the antenna apparatus includes at least one group of antenna bays, at least one group of phase-shift feeding networks, and at least one beamforming network that have the foregoing described features. It should be particularly noted that in this embodiment, i represents a sequence number and is any integer from 1 to M. The sequence number is merely used to distinguish between different groups of antenna bays, different groups of phase-shift feeding networks, or different beamforming networks. The sequence number does not constitute a limitation on a spatial position relationship between groups of antenna bays in the antenna apparatus. For example, a first group of antenna bays and a second group of antenna bays in the M groups of antenna bays are not necessarily two groups of antenna bays that have adjacent spatial positions.

It should be further noted that the S groups of antenna bays may be horizontally or vertically deployed. This is not specifically limited in this application. The $N_i$ bays included in the $i^{th}$ group of antenna bays in the M groups of antenna bays may be horizontally deployed, or may be vertically deployed. This is not specifically limited in this application. When the $N_i$ bays are horizontally deployed, a beam formed by the beamforming network is a beam in a horizontal direction. When the $N_i$ bays are vertically deployed, a beam formed by the beamforming network is a beam in a vertical direction.

Specifically, in this embodiment of this application, the antenna bay is configured to transmit or receive a signal, and the beamforming network is configured to form a beam corresponding to each group of antenna bays. When the antenna apparatus is in the first state, the beamforming network may be used to aggregate $N_i$ beams generated by each group of antenna bays to form $n_i$ orthogonal beams. When the antenna apparatus is in the second state, the beamforming network may directly connect each group of phase-shift feeding networks to the antenna ports, and does not process beams corresponding to the $N_i$ bays, that is, forms $N_i$ through beams corresponding to the antenna bays.

In an optional manner, the antenna apparatus may further include L antenna ports, a port correction network corresponding to the L antenna ports, and a correction port.

A quantity of antenna ports is equal to a sum of quantities of antenna bays included in each of the S groups of antenna bays, that is, L is equal to a total quantity of bays included in the S groups of antenna bays. When the antenna apparatus is in the second state, all the L antenna ports are valid ports. When the antenna apparatus is in the first state, a quantity of valid ports is less than L. It should be understood that the valid port is a port that can form a path to transmit a signal.

The port correction network is configured to couple signals corresponding to the L antenna ports to the correction port.

Figure 2B:
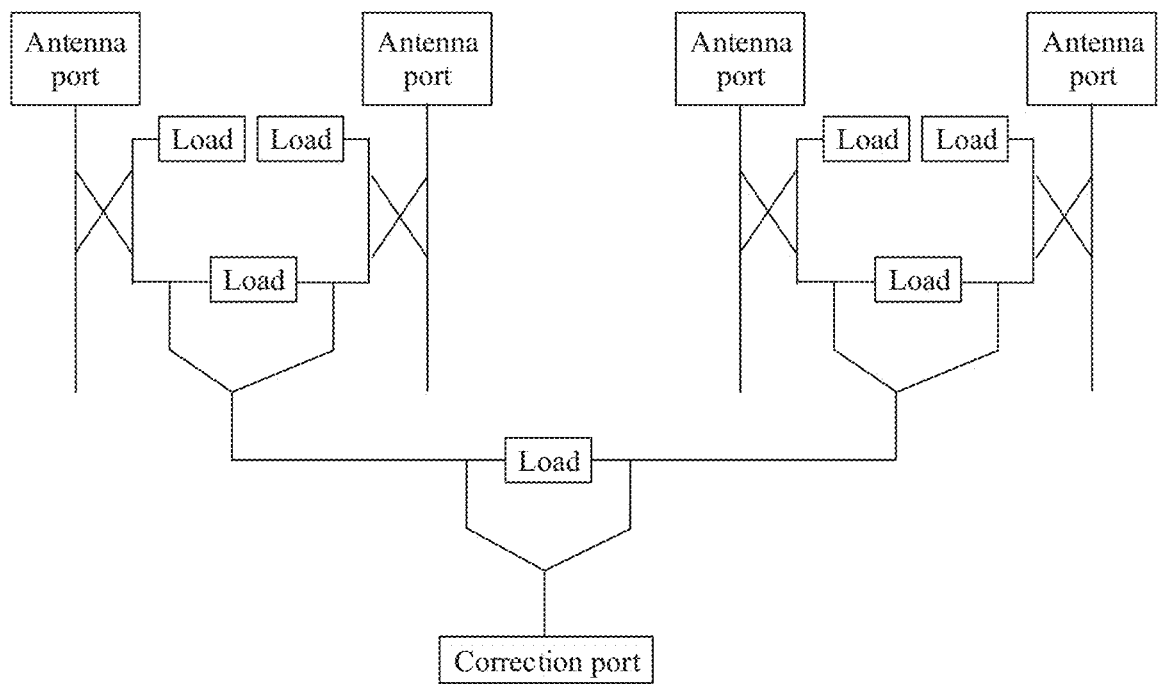
FIG. 2B is a schematic diagram of an embodiment of a port correction network according to the embodiments of this application.

Specifically, when the antenna apparatus is in the second state, the correction port may be connected to a port corresponding to a correction module in a radio frequency system, so that the correction module can correct the signals corresponding to the L antenna ports of the antenna apparatus. As shown in FIG. 2B, FIG. 2B is a schematic diagram of connections between four antenna ports, a corresponding port correction network, and a correction port when L=4. It should be understood that FIG. 2B is merely used as an example and does not constitute a limitation on this application.

When the antenna apparatus is in the first state, the correction port may be connected to a port corresponding to the correction module in the radio frequency system, or may not be connected to the port corresponding to the correction module in the radio frequency system, and be in an idle state. This is not limited in this application.

It should be noted that the antenna port is an external port of the antenna apparatus, and is configured to connect to a radio frequency module; and the port correction network is also referred to as a coupling correction network, where the coupling correction network is configured to couple signals corresponding to the external port of the antenna apparatus to the correction port. When the antenna apparatus is in the second state, the correction port may be connected to a port of the correction module, so that the correction module can correct, based on the signals coupled to the correction port, a signal transmitted between the radio frequency module and the antenna port, thereby implementing joint signal receiving, demodulation, or sending performed by a massive MIMO. Specifically, in this application, the antenna apparatus in the embodiment corresponding to FIG. 2A may be controlled by a control apparatus. After receiving a switching instruction, the control apparatus may switch the antenna apparatus from the first state to the second state or switch the antenna apparatus from the second state to the first state based on the switching instruction. It can be learned from the foregoing description that the first state is a multi-beam antenna state, the second state refers to a massive MIMO state.

The antenna apparatus in this embodiment of this application may be flexibly switched between the multi-beam antenna state and the MM state based on a service requirement. For example, in a small-packet service scenario, the antenna apparatus may be used as a multi-beam antenna to save resources. In a scenario in which users are not evenly distributed, the antenna apparatus may be used as an MM. In other words, the antenna apparatus in this application may be applicable to a plurality of service scenarios, and has high flexibility.

Figure 3A:
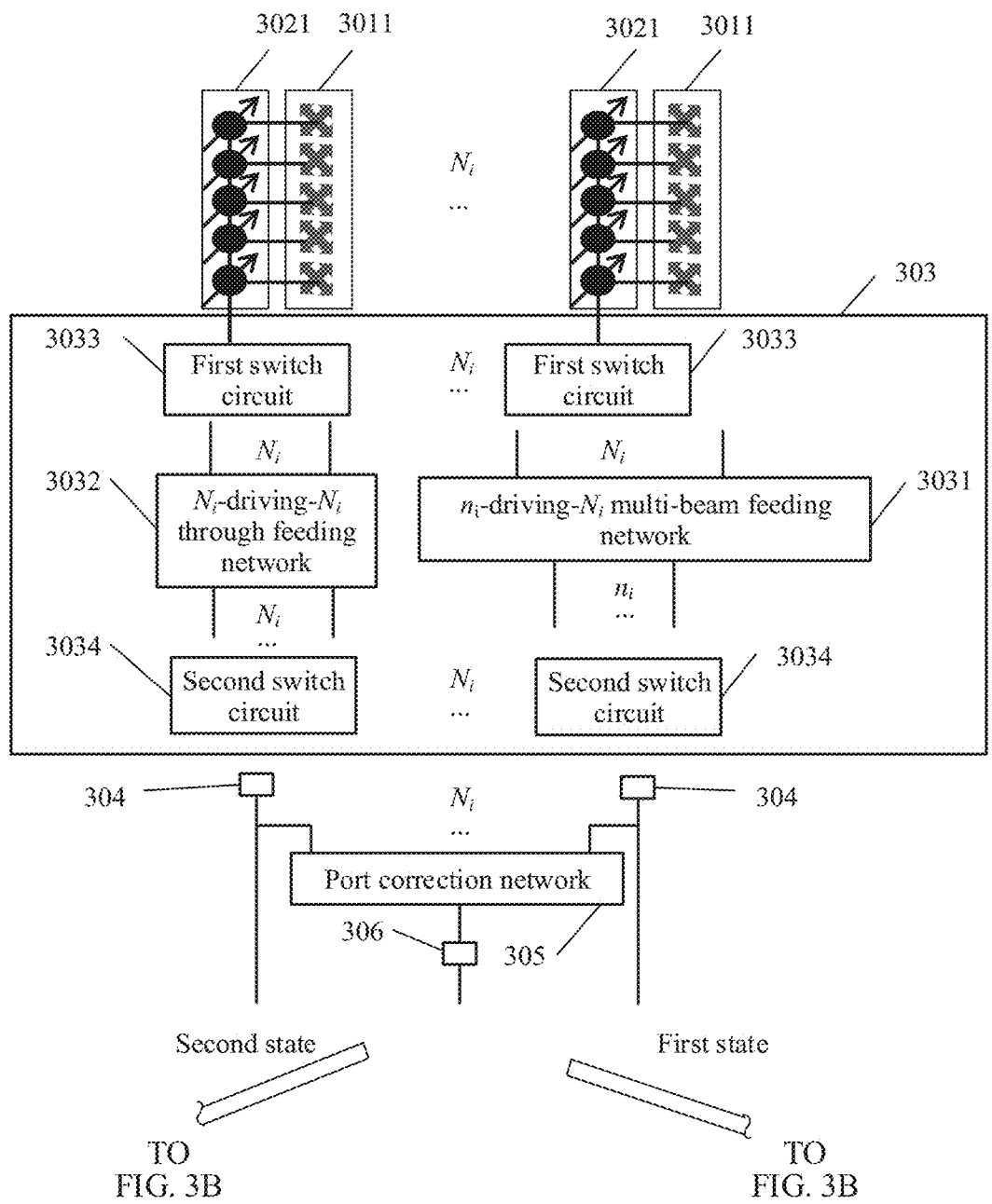
FIG. 3A and FIG. 3B are schematic diagrams of another embodiment of an antenna apparatus according to the embodiments of this application.
Figure 3B:
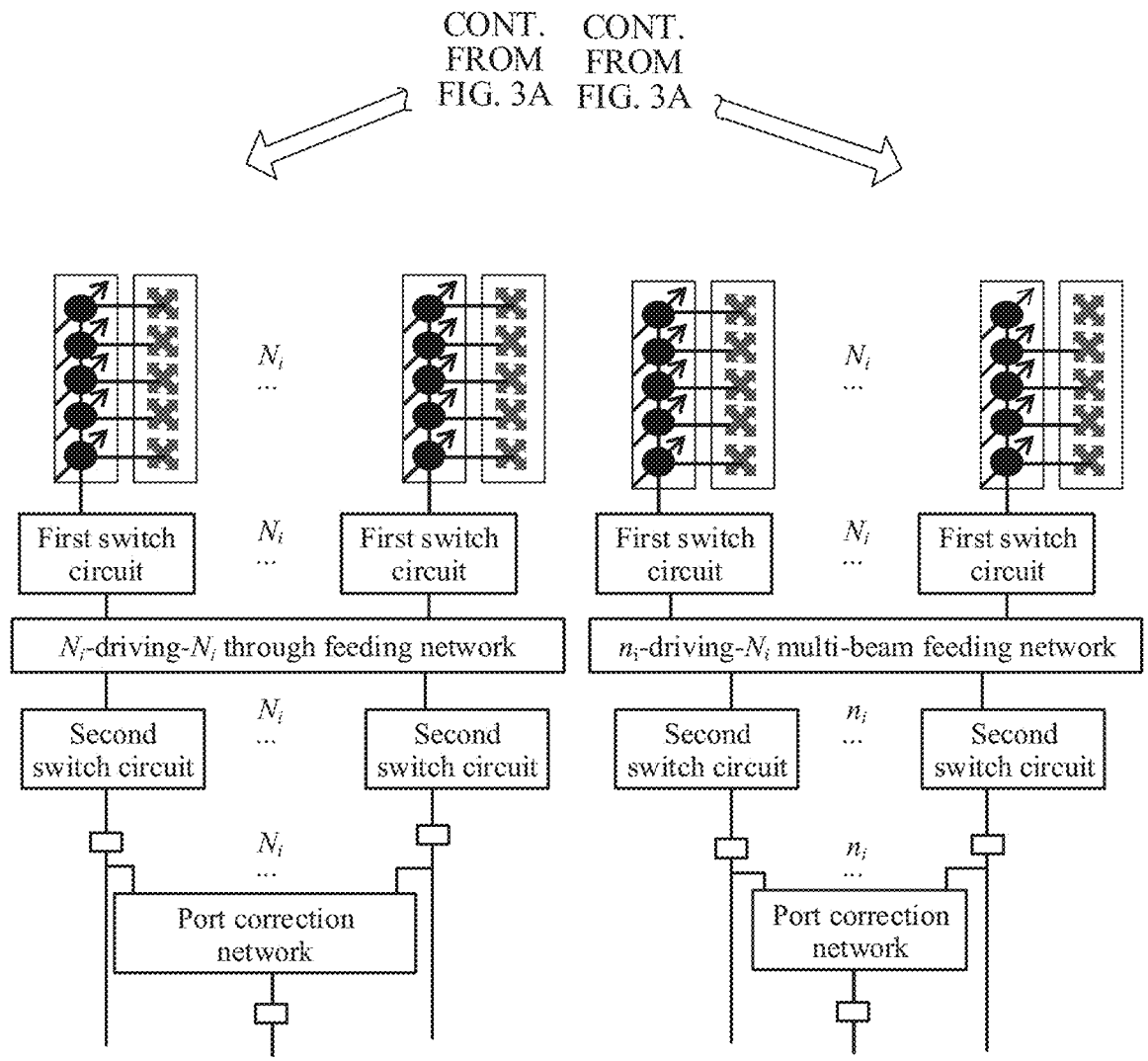

Based on the embodiment corresponding to FIG. 2A, the beamforming network may have a plurality of types of compositions. The following describes one of the compositions in detail. Referring to FIG. 3A and FIG. 3B, another embodiment of the antenna apparatus in the embodiments of this application includes S groups of antenna bays, S groups of phase-shift feeding networks, and S beamforming networks.

One group of antenna bays correspond to one group of phase-shift feeding networks and one beamforming network. Each group of antenna bays may have same or different compositions, each group of phase-shift feeding networks may have same or different compositions, and each beamforming network may have same or different compositions. This is not specifically limited in this application.

In the S beamforming networks, M beamforming networks form different beams when the antenna apparatus is in different states. The following describes the M beamforming networks, and M groups of antenna bays and M groups of phase-shift feeding networks that correspond to the M beamforming networks.

An $i^{th}$ group of antenna bays 301 in the M groups of antenna bays include $N_i$ bays 3011; an $i^{th}$ group of phase-shift feeding networks 302 in the M groups of phase-shift feeding networks include $N_i$ phase-shift feeding networks 3021; and an $i^{th}$ beamforming network 303 in the M beamforming networks includes an $n_i$-driving-$N_i$ multi-beam feeding network 3031, an $N_i$-driving-$N_i$ through feeding network 3032, $N_i$ first switch circuits 3033, and $N_i$ second switch circuits 3034.

When the antenna apparatus is in a first state, the $N_i$ bays 3011 in the $i^{th}$ group of antenna bays 301 are connected, in a one-to-one correspondence, to $N_i$ input ports corresponding to the $N_i$ phase-shift feeding networks 3021 in the $i^{th}$ group of phase-shift feeding networks 302, $N_i$ output ports corresponding to the $N_i$ phase-shift feeding networks 3021 are connected, in a one-to-one correspondence, to $N_i$ input ports corresponding to the $N_i$ first switch circuits 3033, $N_i$ output ports corresponding to the $N_i$ first switch circuits 3033 are connected, in a one-to-one correspondence, to $N_i$ input ports corresponding to the $n_i$-driving-$N_i$ multi-beam feeding network 3031, $n_i$ output ports corresponding to the $n_i$-driving-$N_i$ multi-beam feeding network 3031 are connected, in a one-to-one correspondence, to $n_i$ input ports corresponding to $n_i$ second switch circuits 3034, and $n_i$ output ports corresponding to the $n_i$ second switch circuits 3034 are connected to $n_i$ antenna ports 304 in a one-to-one correspondence, where the $n_i$-driving-$N_i$ multi-beam feeding network 3031 is configured to form $n_i$ orthogonal beams corresponding to the $N_i$ bays.

When the antenna apparatus is in a second state, the $N_i$ bays 3011 in the $i^{th}$ group of antenna bays 301 are connected, in a one-to-one correspondence, to $N_i$ input ports corresponding to the $N_i$ phase-shift feeding networks 3021 in the $i^{th}$ group of phase-shift feeding networks 302, $N_i$ output ports corresponding to the $N_i$ phase-shift feeding networks 3021 are connected, in a one-to-one correspondence, to $N_i$ input ports corresponding to the $N_i$ first switch circuits 3033, $N_i$ output ports corresponding to the $N_i$ first switch circuits 3033 are connected, in a one-to-one correspondence, to $N_i$ input ports corresponding to the $N_i$-driving-$N_i$ through feeding network 3032, $N_i$ output ports corresponding to the $N_i$-driving-$N_i$ through feeding network 3032 are connected, in a one-to-one correspondence, to $N_i$ input ports corresponding to the $N_i$ second switch circuits 3034, $N_i$ output ports corresponding to the $N_i$ second switch circuits 3034 are connected to $N_i$ antenna ports 304 in a one-to-one correspondence, and the $N_i$ antenna port 304 are connected to a port correction network 305.

In an optional manner, the antenna apparatus in this embodiment may further include L antenna ports 304, a port correction network 305 corresponding to the L antenna ports, and a correction port 306.

A quantity of antenna ports is equal to a sum of quantities of antenna bays included in each of the S groups of antenna bays, that is, L is equal to a total quantity of bays included in the S groups of antenna bays. When the antenna apparatus is in the second state, all the L antenna ports are valid ports. When the antenna apparatus is in the first state, a quantity of valid ports is less than L. It should be understood that the valid port is a port that can form a path to transmit a signal.

The port correction network 305 is configured to couple signals corresponding to the L antenna ports to the correction port 306. When the antenna apparatus is in the second state, the correction port is connected to a port corresponding to a correction module in a radio frequency system, so that the correction module can correct the signals corresponding to the L antenna ports of the antenna apparatus. When the antenna apparatus is in the first state, the correction port may be connected to a port corresponding to a correction module in a radio frequency system, or may not be connected to the port corresponding to the correction module in the radio frequency system, and be in an idle state. This is not limited in this application.

Specifically, in this embodiment, the $N^i$ first switch circuits 3033 in the $i^{th}$ beamforming network 303 are configured to select whether the $i^{th}$ group of phase-shift feeding networks 302 are connected to the $N_i$-driving-$N_i$ through feeding network 3032 or the $n_i$-driving-$N_i$ multi-beam feeding network 3031.

The second switch circuit 3034 is configured to select whether to connect the $N_i$-driving-$N_i$ through feeding network 3032 to the $N_i$ antenna ports 3034, or to connect the $n_i$-driving-$N_i$ multi-beam feeding network 3031 to the $n_i$ antenna ports 3034.

When the antenna apparatus is in the first state, the $n_i$-driving-$N_i$ multi-beam feeding network 3031 may process $N_i$ channels of received signals to obtain $n_i$ channels of received signals which are to be transmitted to the radio frequency module by using the $n_i$ antenna ports 3034, or process $n_i$ channels of transmitted signals to obtain $N_i$ channels of transmitted signals and transmit the $N_i$ channels of transmitted signals to a user by using the $N_i$ bays. Specifically, the $n_i$-driving-$N_i$ multi-beam feeding network may be a Butler matrix feeding network, a Rotman lens feeding network, or another feeding network. This is not specifically limited in this application.

When the antenna apparatus is in the second state, the $N_i$-driving-$N_i$ through feeding network 3032 may directly connect the $N_i$ phase-shift feeding network 3021 to the $N_i$ antenna ports in a one-to-one correspondence, that is, not process a signal received or transmitted by the $N_i$ bays 3031, but directly transmit signals received by the $N_i$ bays 3031 to the radio frequency system by using the $N_i$ antenna ports 3034. Specifically, the $N_i$-driving-$N_i$ through feeding network 3032 may be a through feeding network 3032 that is bypassed to the $n_i$-driving-$N_i$ multi-beam feeding network 3031 and that includes one or more feeders. The $N_i$-driving-$N_i$ through feeding network 3032 may alternatively be another feeding network. This is not specifically limited in this application.

It should be noted that FIG. 3A and FIG. 3B are only schematic diagrams of connections between one group of antenna bays, one group of phase-shift feeding networks, and one beamforming network. A quantity of elements included in each bay, a quantity of phase-shift feeding networks, a quantity of antenna ports, a placement position and a connection relationship of each physical device, and the like are merely used as an example, and do not constitute a limitation on this application.

It should be further noted that, in addition to the structure described in the embodiment corresponding to FIG. 3A and FIG. 3B, in some embodiments, the $i^{th}$ beamforming network may alternatively be a target network obtained by reconstructing the $n_i$-driving-$N_i$ multi-beam feeding network, and the target network obtained through reconstruction may be switched from the $n_i$-driving-$N_i$ multi-beam feeding network to the $N_i$-driving-$N_i$ through feeding network, or may be switched from the $N_i$-driving-$N_i$ through feeding network to the $n_i$-driving-$N_i$ multi-beam feeding network.

Specifically, in this application, the antenna apparatus in the embodiment corresponding to FIG. 3A and FIG. 3B may be controlled by a control apparatus. After receiving a switching instruction, the control apparatus may switch the antenna apparatus from the first state to the second state or switch the antenna apparatus from the second state to the first state based on the switching instruction. It can be learned from the foregoing description that the first state is a multi-beam antenna state, the second state refers to a massive MIMO state.

Corresponding to the antenna apparatus shown in FIG. 3A and FIG. 3B, a process of controlling, by the control apparatus, the antenna apparatus to switch from the first state to the second state may include: controlling the $N_i$ first switch circuits 3033 and the $N_i$ second switch circuits 3034 in the $i^{th}$ beamforming network 303, to connect the $i^{th}$ group of phase-shift feeding networks 302 to the $N_i$-driving-$N_i$ through feeding network 3032, and connect the $N_i$-driving-$N_i$ through feeding network 3032 to the $N_i$ antenna ports 3034. A specific connection relationship is described in the embodiment corresponding to FIG. 3A and FIG. 3B.

A process of controlling, by the control apparatus, the antenna apparatus to switch from the second state to the first state may include: controlling the $N_i$ first switch circuits 3033 and the $N_i$ second switch circuits 3034 in the $i^{th}$ beamforming network 303, to connect the $i^{th}$ group of phase-shift feeding networks 302 to the $n_i$-driving-$N_i$ multi-beam feeding network 3031, and connect the $n_i$-driving-$N_i$ multi-beam feeding network 3031 to the $n_i$ antenna ports 3034. A specific connection relationship is described in the embodiment corresponding to FIG. 3A and FIG. 3B.

In an optional manner, the control apparatus may include a first control apparatus and a second control apparatus. The $N_i$ first switch circuits in the $i^{th}$ beamforming network may be controlled by the first control apparatus in a coordinated manner. To be specific, for the $N_i$ first switch circuits, when one first switch circuit selects to be connected to the $N_i$- driving-$N_i$ through feeding network, other first switch circuits are also connected to the $N_i$-driving-$N_i$ through feeding network; or when one first switch circuit selects to be connected to the $n_i$-driving-$N_i$ multi-beam feeding network, other first switch circuits are also connected to the $n_i$-driving-$N_i$ multi-beam feeding network. The $n_i$ second switch circuits in the $i^{th}$ beamforming network may be controlled by the first control apparatus in a coordinated manner. To be specific, for the $n_i$ second switch circuits, when one second switch circuit selects to be connected to the $N_i$-driving-$N_i$ through feeding network and the antenna ports, other second switch circuits are also connected to the $N_i$-driving-$N_i$ through feeding network and the antenna ports; or when one second switch circuit selects to be connected to the $n_i$-driving-$N_i$ multi-beam feeding network, other second switch circuits also select to be connected to the $n_i$-driving-$N_i$ multi-beam feeding network and the antenna ports.

It should be noted that, when the antenna apparatus is in the first state, in the $N_i$ second switch circuits in the $i^{th}$ beamforming network, except for $n_i$ second switch circuit connected to the $n_i$-driving-$N_i$ multi-beam feeding network, one end of each of $N_i-n_i$ second switch circuits may keep being connected to the $N_i$-driving-$N_i$ through feeding network, or may be disconnected from the $N_i$-driving-$N_i$ through feeding network, and the other end of each of the $N_i-n_i$ second switch circuits may keep being connected to the antenna ports, or may be disconnected from the antenna ports.

It should be further noted that the first switch circuits in this embodiment of this application may be the same or may be different. Specifically, the first switch circuits may be digitally-controlled radio frequency selection switches, or may be mechanically-triggered radio frequency selection switches, or may be switches of another type. This is not specifically limited herein. The second switch circuits may be the same or may be different. Specifically, the second switch circuits may be digitally-controlled radio frequency selection switches, or may be mechanically-triggered radio frequency selection switches, or may be switches of another type. This is not specifically limited herein.

In an optional manner, in this embodiment, the antenna apparatus includes a plurality of groups of antenna bays, a plurality of groups of feeding networks, and a plurality of beamforming networks, that is, S is greater than or equal to 2.

A $j^{th}$ group of antenna bays 401 in the S groups of antenna bays include $N_j$ bays 4011, a $j^{th}$ group of phase-shift feeding networks 402 include $N_j$ phase-shift feeding networks 4021, and the $N_j$ bays 4011 are connected to $N_j$ phase-shift feeding networks 4021 in a one-to-one correspondence, where $N_j$ is an integer greater than or equal to 1.

Figure 4A:
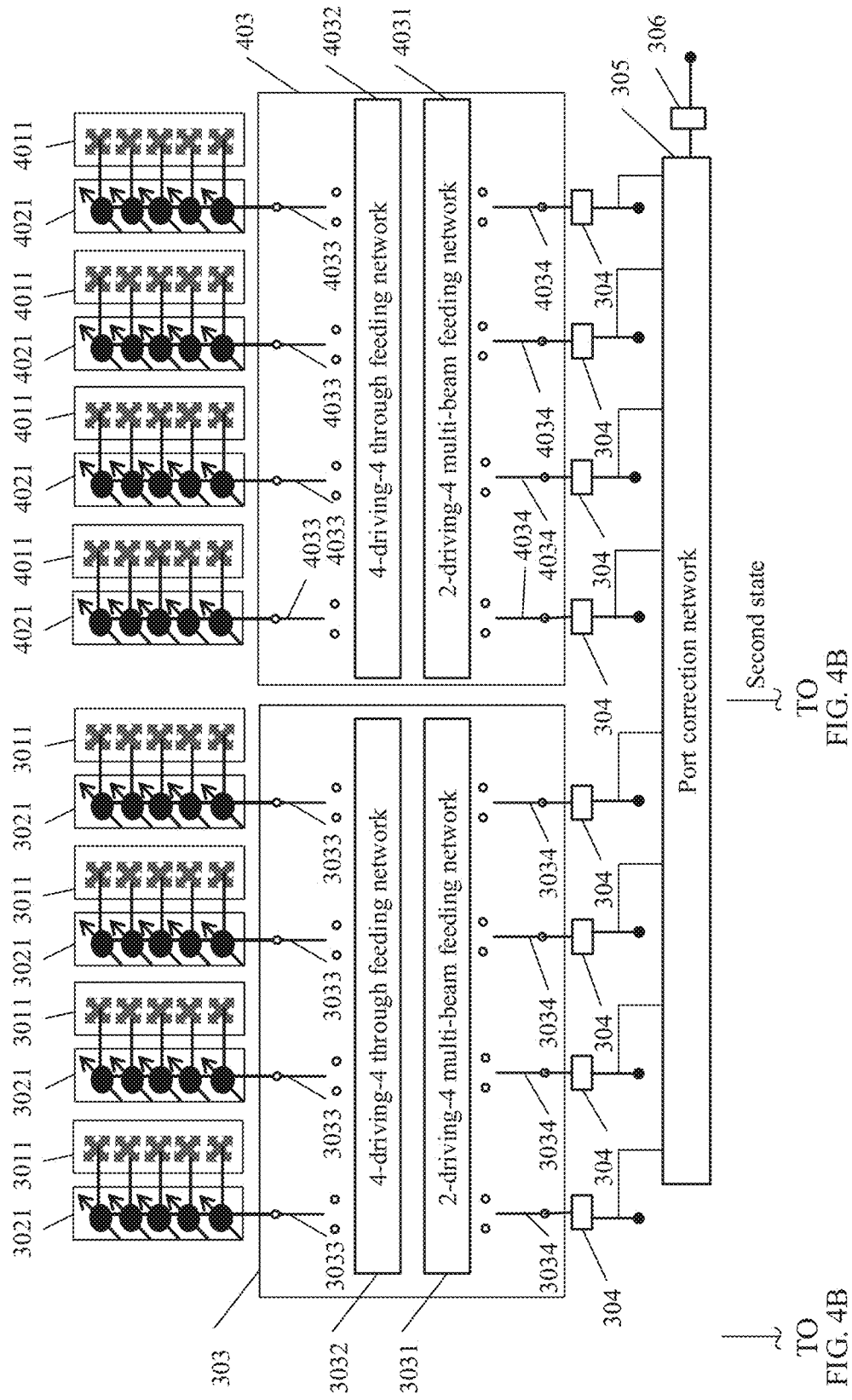
FIG. 4A, FIG. 4B, and FIG. 4C are schematic diagrams of another embodiment of an antenna apparatus according to the embodiments of this application.
Figure 4B:
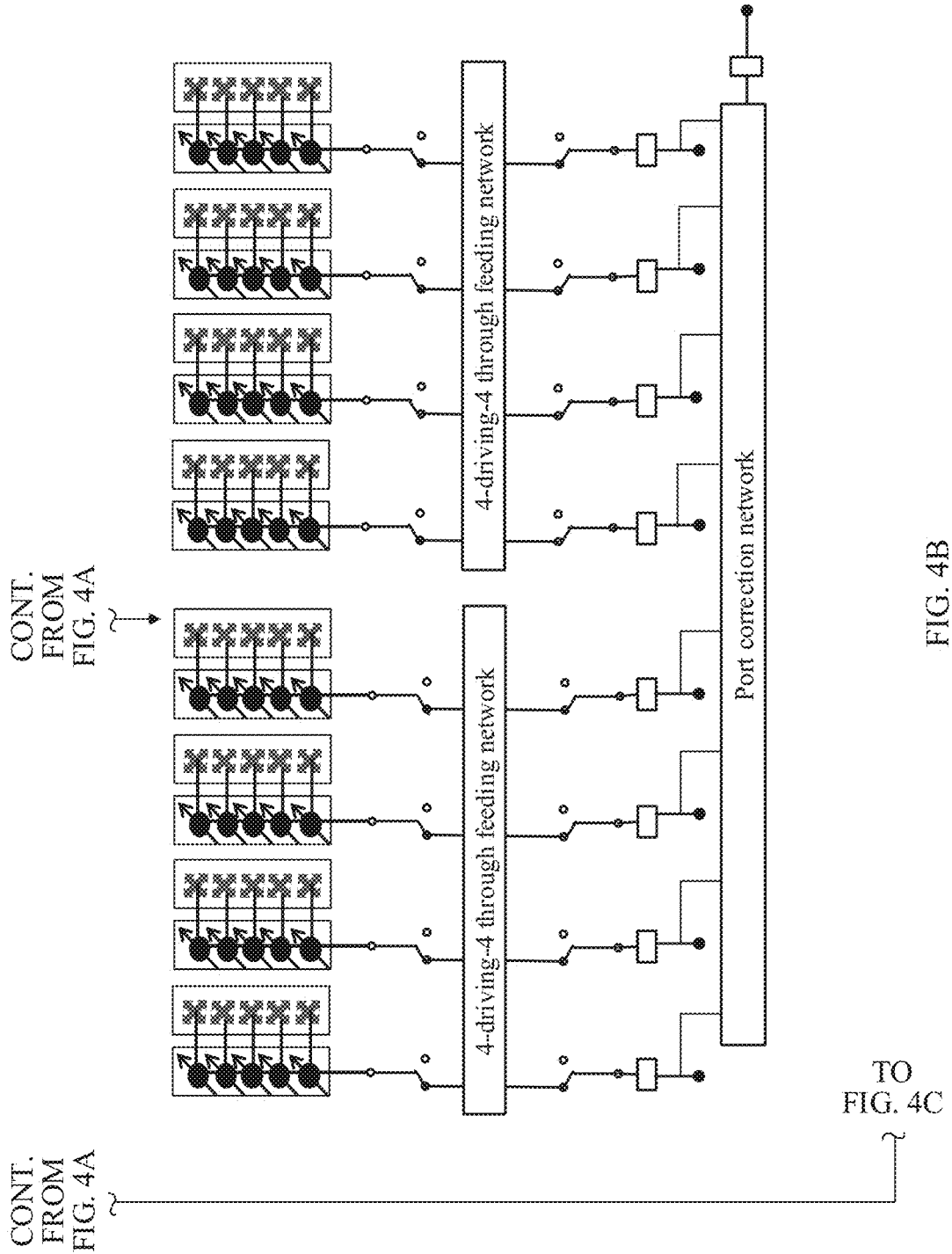
Figure 4C:
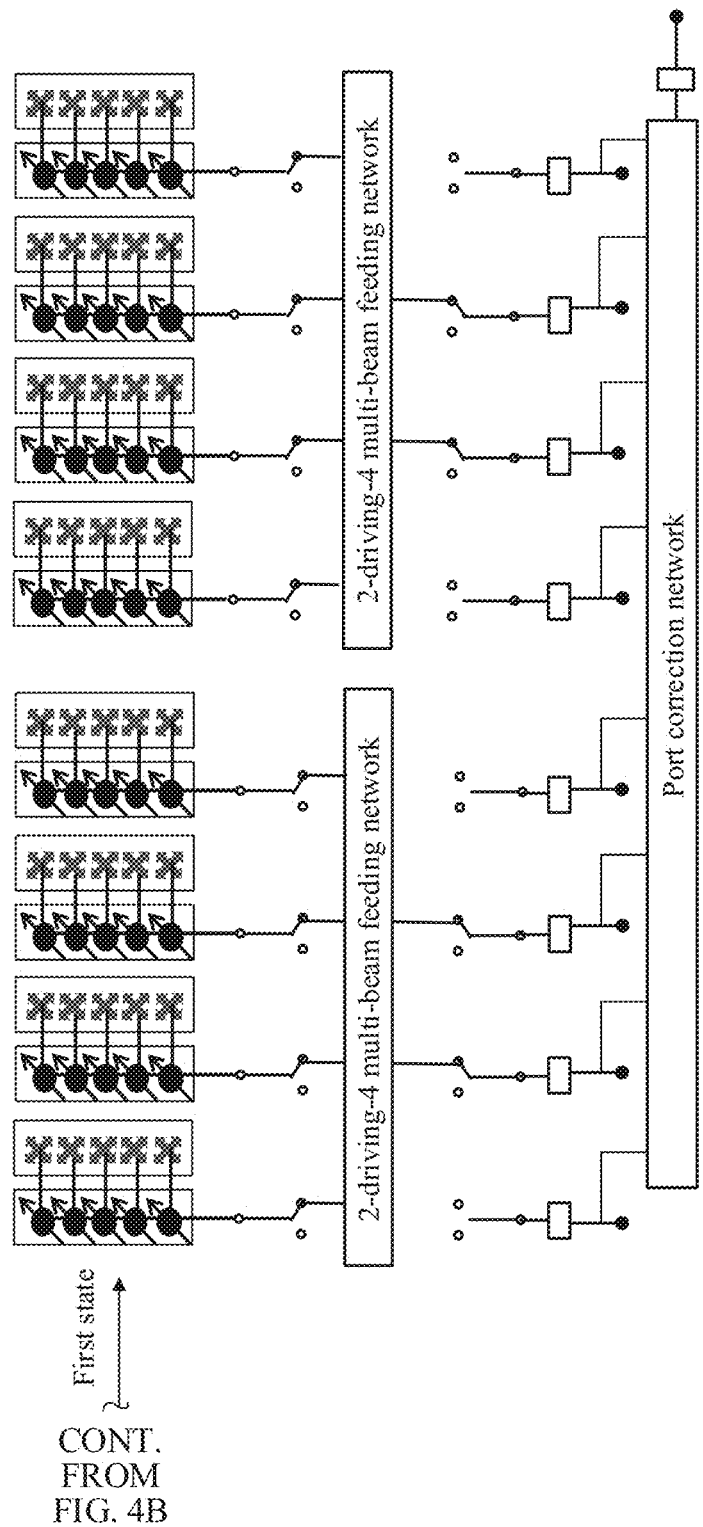

A $j^{th}$ beamforming network 403 corresponding to the $j^{th}$ group of antenna bays 401 and the $j^{th}$ group of phase-shift feeding networks 402 may be the same as the above $i^{th}$ beamforming network, including an $n_j$-driving-$N_j$ multi-beam feeding network 4031, an $N_j$-driving-$N_j$ through feeding network 4032, $N_j$ first switch circuits 4033, and $N_j$ second switch circuits 4034. FIG. 4A, FIG. 4B, and FIG. 4C are schematic diagrams of the antenna apparatus when S=2, $N_i$=4, $n_i$=2, $N_j$=4, and $n_j$=2.

When the antenna apparatus is in the first state, $N_j$ input ports corresponding to the $N_j$ first switch circuits 4033 are connected, in a one-to-one correspondence, to $N_j$ output ports corresponding to the $N_j$ phase-shift feeding networks 4021, $N_j$ output ports corresponding to the $N_j$ first switch circuits 4033 are connected, in a one-to-one correspondence, to $N_j$ input ports corresponding to the $n_j$-driving-$N_j$ multi-beam feeding network 4031, $n_j$ output ports corresponding to the $n_j$-driving-$N_j$ multi-beam feeding network 4031 are connected, in a one-to-one correspondence, to $n_j$ input ports corresponding to $n_j$ second switch circuits 4034, and $n_j$ output ports corresponding to the $n_j$ second switch circuits 4034 are connected, in a one-to-one correspondence, to $n_j$ antenna ports 304 except the foregoing $n_i$ antenna ports in the L antenna ports, where the $n_j$-driving-$N_j$ multi-beam feeding network 4031 is configured to form $n_j$ orthogonal beams corresponding to the $N_j$ bays.

When the antenna apparatus is in the second state, $N_j$ input ports corresponding to the $N_j$ first switch circuits 4033 are connected, in a one-to-one correspondence, to $N_j$ output ports corresponding to the $N_j$ phase-shift feeding networks 4021, $N_j$ output ports corresponding to the $N_j$ first switch circuits 4033 are connected, in a one-to-one correspondence, to $N_j$ input ports corresponding to the $N_j$-driving-$N_j$ through feeding network 4032, $N_j$ output ports corresponding to the $N_j$-driving-$N_j$ through feeding network 4032 are connected, in a one-to-one correspondence, to $N_j$ input ports corresponding to the $N_j$ second switch circuits 4034, and $N_j$ output ports corresponding to the second switch circuits 4034 are connected, in a one-to-one correspondence, to $N_j$ antenna ports 304 except the foregoing $N_i$ antenna ports in the L antenna ports, where the $N_j$-driving-$N_j$ through feeding network 4032 is configured to form $N_j$ through beams corresponding to the $N_j$ bays.

Figure 5A:
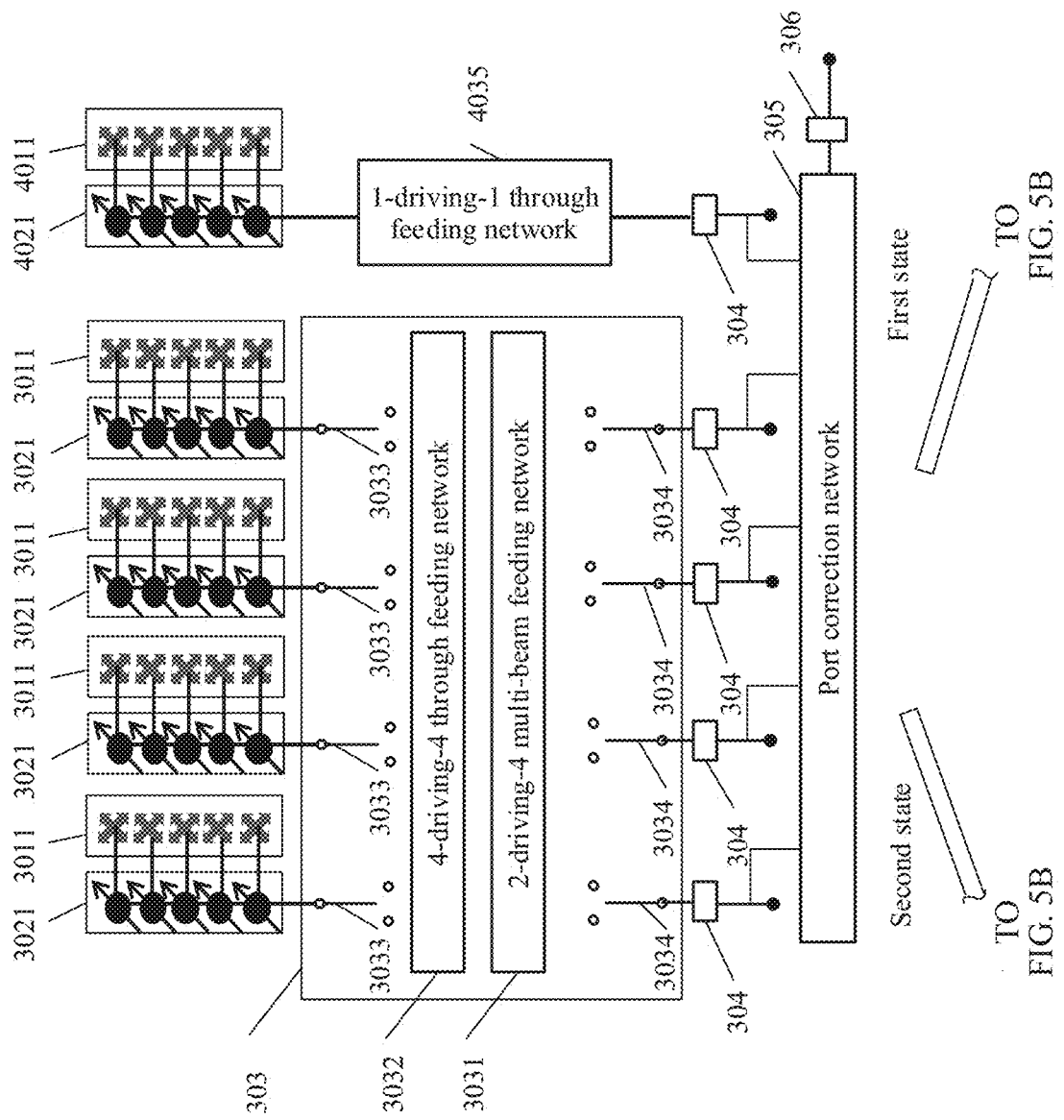
FIG. 5A and FIG. 5B are schematic diagrams of another embodiment of an antenna apparatus according to the embodiments of this application.
Figure 5B:
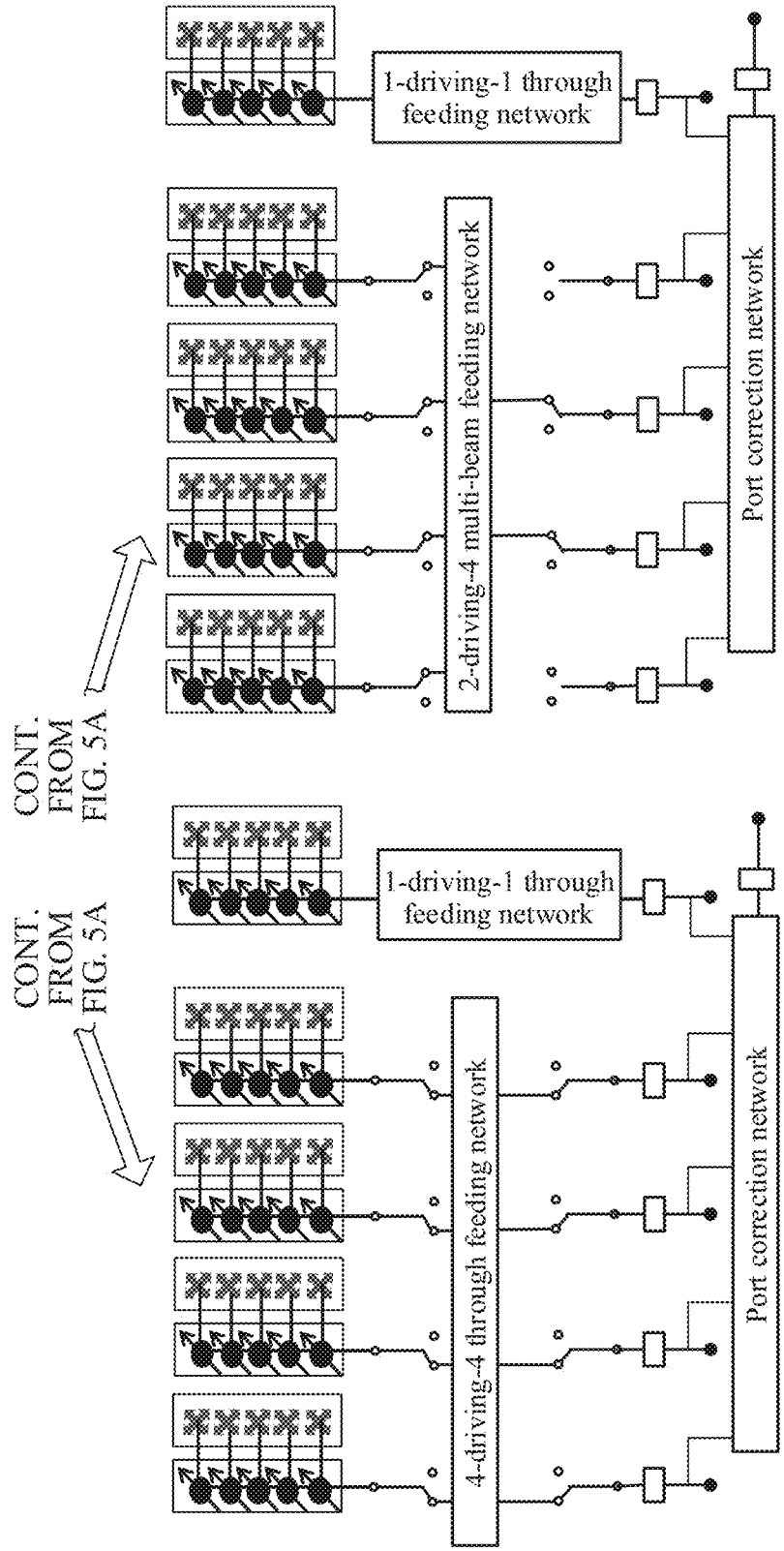

The $j^{th}$ beamforming network 403 corresponding to the $j^{th}$ group of antenna bays 401 and the $j^{th}$ group of phase-shift feeding networks 402 may further include an $N_j$-driving-$N_j$ through feeding network 4035. $N_j$ input ports corresponding to the $N_j$-driving-$N_j$ through feeding network 4035 are connected, in a one-to-one correspondence, to $N_j$ output ports corresponding to the $N_j$ phase-shift feeding networks 4021. $N_j$ input ports corresponding to the $N_j$-driving-$N_j$ through feeding network 4035 are connected to $N_j$ antenna ports in a one-to-one correspondence. In this case, regardless of whether the antenna apparatus is in the first state or the second state, the $N_j$-driving-$N_j$ through feeding network 4035 forms $N_j$ through beams corresponding to the $N_j$ bays. FIG. 5A and FIG. 5B are schematic diagrams of the antenna apparatus when S=2, $N_i$=4, $n_i$=2, and $N_j$=1.

Specifically, in this embodiment, the control apparatus may control, by using the $i^{th}$ group of phase-shift feeding networks, downtilt angles of beams corresponding to the $i^{th}$ group of antenna bays, and may control, by using the $j^{th}$ group of phase-shift feeding networks, downtilt angles of beams corresponding to the $j^{th}$ group of antenna bays, so that the downtilt angle of the beam corresponding to each bay in the $i^{th}$ group of antenna bays is within a first preset range, and the downtilt angle of the beam corresponding to each bay in the $j^{th}$ group of antenna bays is within a second preset range.

It should be understood that the foregoing downtilt angle of the beam may be specifically an azimuth angle or a pitch angle. Whether the phase-shift feeding network is configured to control the azimuth angle or the pitch angle of the beam is related to a deployment position and a connection relationship of the bay. A state of a beam that the antenna apparatus finally forms may vary with a relationship between downtilt angles of beams corresponding to each group of antenna bays. The following describes several cases.

1. Horizontal Deployment

In this embodiment, the $N_i$ bays included in the $i^{th}$ group of antenna bays are horizontally deployed, and the $N_i$ phase-shift feeding networks in the $i^{th}$ group of phase-shift feeding networks are connected, in a one-to-one correspondence, to the $N_i$ horizontally deployed bays to control pitch angles of beams corresponding to the $N_i$ bays, so that the pitch angles of the beams corresponding to the $N_i$ bays are equal.

The $N_j$ bays included in the $j^{th}$ group of antenna bays are also horizontally deployed, and the $N_j$ phase-shift feeding networks in the $j^{th}$ group of phase-shift feeding networks are connected, in a one-to-one correspondence, to the $N_j$ horizontally deployed bays to control pitch angles of beams corresponding to the $N_j$ bays, so that the pitch angles of the beams corresponding to the $N_j$ bays are equal.

Figure 6:
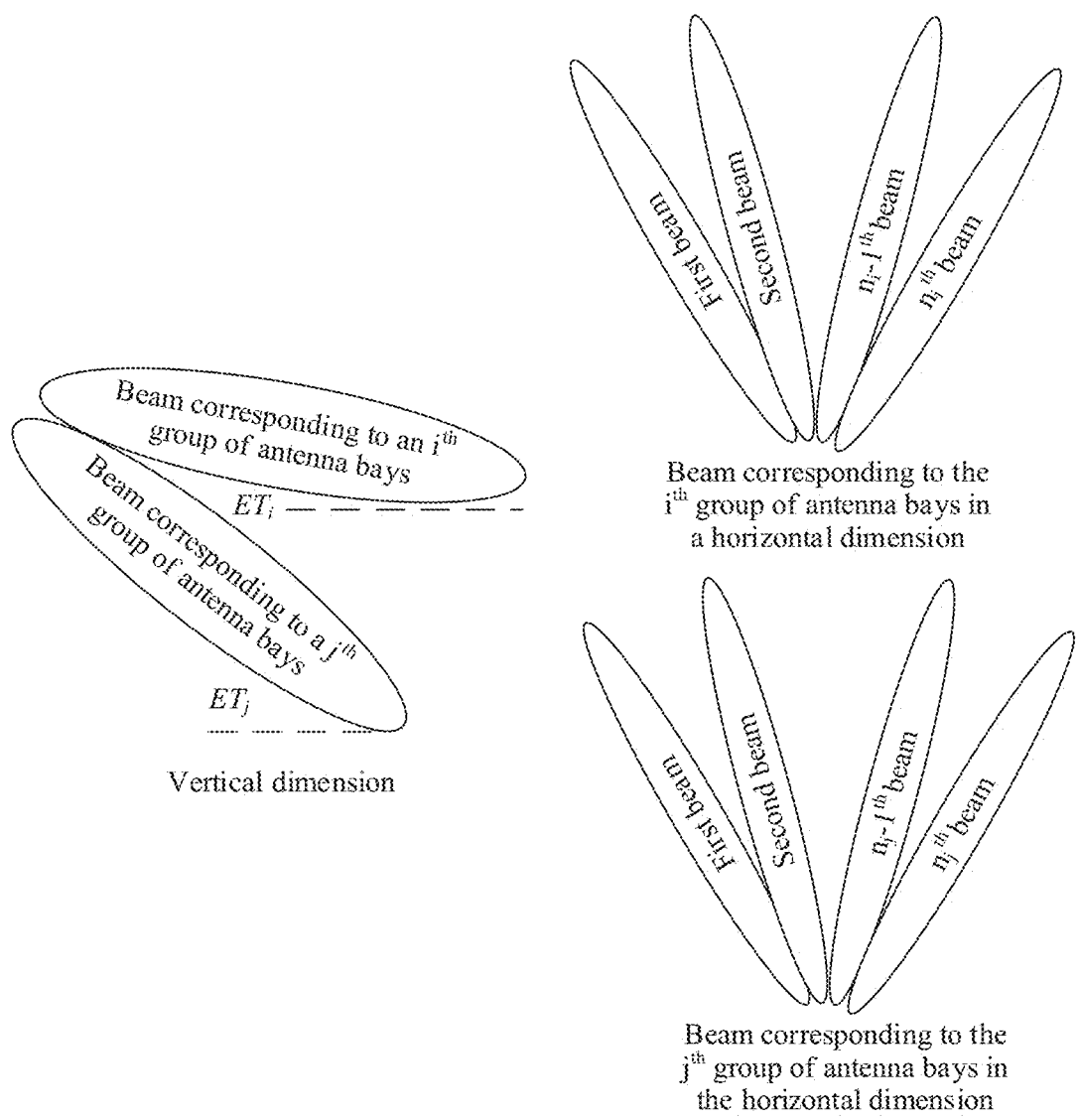
FIG. 6 is a schematic diagram of a beam formed by an antenna apparatus according to an embodiment of this application.

When the antenna apparatus is in the first state, the $i^{th}$ group of phase-shift feeding networks control the pitch angles of the beams corresponding to the $i^{th}$ group of antenna bays, and the $j^{th}$ group of phase-shift feeding networks control the pitch angles of the beams corresponding to the $j^{th}$ group of antenna bays, so that the pitch angles of the beams corresponding to the $i^{th}$ group of antenna bays are not equal to the pitch angles of the beams corresponding to the $j^{th}$ group of antenna bays. Therefore, the antenna apparatus can form a plurality of beams in both a horizontal dimension and a vertical dimension, that is, can form three-dimensional multi beams, as shown in FIG. 6.

When the antenna apparatus is in the first state, $n_i$ horizontal orthogonal beams corresponding to the $N_i$ bays in the $i^{th}$ group of antenna bays are formed, and $N_j$ through beams or $n_j$ horizontal orthogonal beams corresponding to the $N_j$ bays in the $j^{th}$ group of antenna bays are further formed. To avoid interference between the beams corresponding to the $i^{th}$ group of antenna bays and two groups of beams corresponding to the $j^{th}$ group of antenna bays, in an optional solution, the $i^{th}$ group of phase-shift feeding networks and the $j^{th}$ group of phase-shift feeding networks may further enable a difference between the pitch angle of the beams corresponding to the $i^{th}$ group of antenna bays and the pitch angle of the beams corresponding to the $j^{th}$ group of antenna bays to be greater than an average value of vertical beam widths corresponding to the two groups of antenna bays.

When the antenna is in the second state, the $i^{th}$ group of phase-shift feeding networks control the pitch angles of the beams corresponding to the $i^{th}$ group of antenna bays, and the $j^{th}$ group of phase-shift feeding networks control the pitch angles of the beams corresponding to the $j^{th}$ group of antenna bays, so that the pitch angles of the beams corresponding to the $i^{th}$ group of antenna bays are equal to the pitch angles of the beams corresponding to the $j^{th}$ group of antenna bays. Therefore, the $i^{th}$ group of antenna bays and the $j^{th}$ group of antenna bays can jointly form a massive MIMO and form corresponding beams.

It should be understood that, in actual application, there may be an error in a pitch angle of a beam corresponding to each bay. The pitch angles of the beams corresponding to the $i^{th}$ group of antenna bays may be specifically an average value $\overline{ET_i}$ of pitch angles of the beams corresponding to all the bays in the $i^{th}$ group of antenna bays, and the pitch angles of the beams corresponding to the $j^{th}$ group of antenna bays may be specifically an average value $\overline{ET_j}$ of pitch angles of the beams corresponding to all the bays in the $j^{th}$ group of antenna bays.

When the antenna apparatus is in the first state, the $i^{th}$ group of phase-shift feeding networks and the $j^{th}$ group of phase-shift feeding networks may enable $\overline{ET_i} - \overline{ET_j} \geq 0$, and may further enable $|\overline{ET_i} - \overline{ET_j}| > (d_i + d_j)/2$ to avoid interference between beams, where $d_i$ is an average vertical beam width of the $n_j$ horizontal orthogonal beams corresponding to the $i^{th}$ group of antenna bays, and $d_j$ is an average vertical beam width of the beams corresponding to the $j^{th}$ group of antenna bays.

When the antenna apparatus is in the second state, the $i^{th}$ group of phase-shift feeding networks and the $j^{th}$ group of phase-shift feeding networks may enable $\overline{ET_i} = \overline{ET_j}$.

It should be noted that, generally, a vertical beam width of a beam refers to an included angle between two directions in which radiated power is reduced by 3 dB on two sides of a maximum radiation direction in a vertical direction.

2. Vertical Deployment

In this embodiment, the $N_i$ bays included in the $i^{th}$ group of antenna bays are vertically deployed, and the $N_i$ phase-shift feeding networks in the $i^{th}$ group of phase-shift feeding networks are connected, in a one-to-one correspondence, to the $N_i$ vertically deployed bays to control azimuth angles of the beams corresponding to the $N_i$ bays, so that the azimuth angles of the beams corresponding to the $N_i$ bays are equal.

The $N_j$ bays included in the $j^{th}$ group of antenna bays are also vertically deployed, and the $N_j$ phase-shift feeding networks in the $j^{th}$ group of phase-shift feeding networks are connected, in a one-to-one correspondence, to the $N_j$ vertically deployed bays to control azimuth angles of beams corresponding to the $N_j$ bays, so that the azimuth angles of the beams corresponding to the $N_j$ bays are equal.

Figure 7:
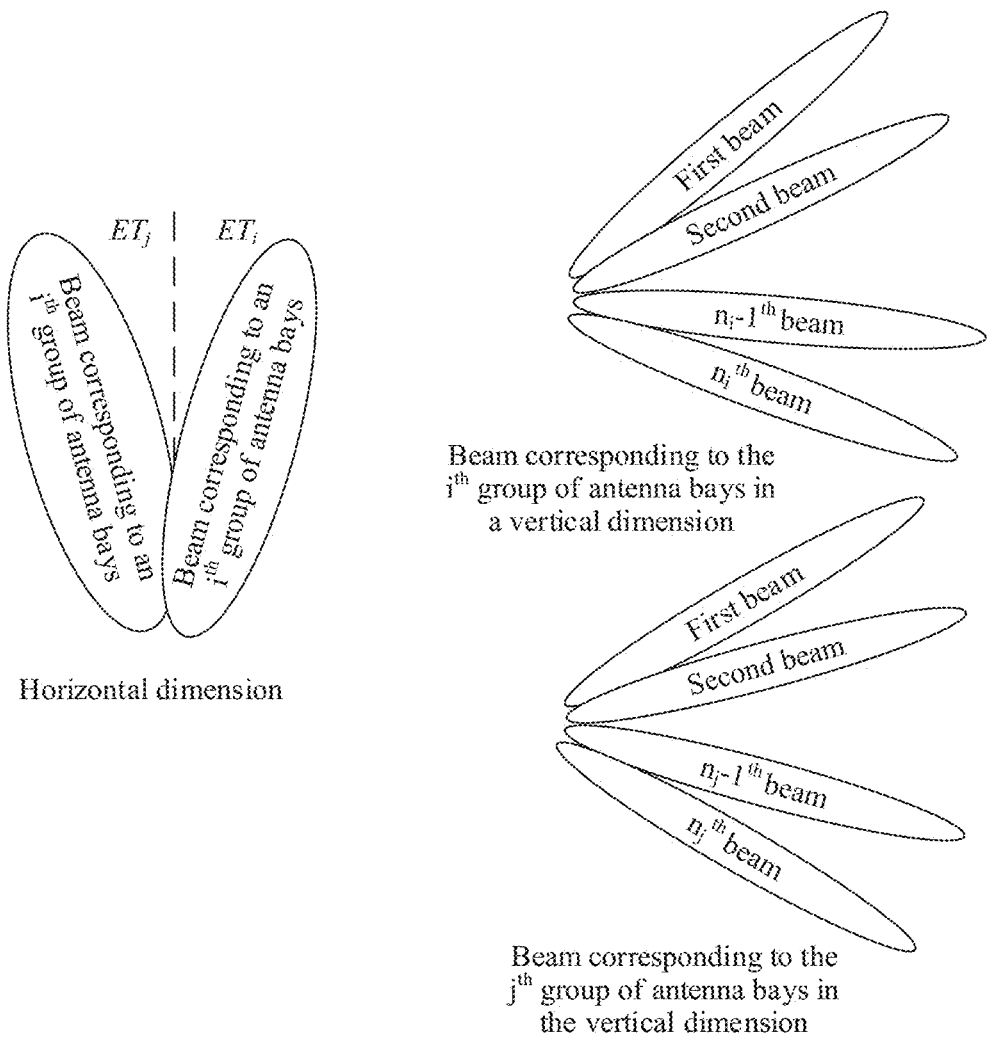
FIG. 7 is a schematic diagram of a beam formed by an antenna apparatus according to an embodiment of this application.

When the antenna apparatus is in the first state, the $i^{th}$ group of phase-shift feeding networks control the azimuth angles of the beams corresponding to the $i^{th}$ group of antenna bays, and the $j^{th}$ group of phase-shift feeding networks control the azimuth angles of the beams corresponding to the $j^{th}$ group of antenna bays, so that the azimuth angles of the beams corresponding to the $i^{th}$ group of antenna bays are not equal to the azimuth angles of the beams corresponding to the $j^{th}$ group of antenna bays. Therefore, the antenna apparatus can form a plurality of beams in both a horizontal dimension and a vertical dimension, that is, can form three-dimensional multi beams, as shown in FIG. 7.

When the antenna apparatus is in the first state, $n_i$ vertical orthogonal beams corresponding to the $N_i$ bays in the $i^{th}$ group of antenna bays are formed, and $N_j$ through beams or $n_j$ vertical orthogonal beams corresponding to the $n_j$ bays in the $j^{th}$ group of antenna bays are further formed. To avoid interference between the beams corresponding to the $i^{th}$ group of antenna bays and two groups of beams corresponding to the $j^{th}$ group of antenna bays, in an optional solution, the $i^{th}$ group of phase-shift feeding networks and the $j^{th}$ group of phase-shift feeding networks may further enable a difference between the azimuth angle corresponding to the $i^{th}$ group of antenna bays and the azimuth angle corresponding to the $j^{th}$ group of antenna bays to be greater than an average value of horizontal beam widths corresponding to the two groups of antenna bays.

When the antenna is in the second state, the $i^{th}$ group of phase-shift feeding networks control the azimuth angles of the beams corresponding to the $i^{th}$ group of antenna bays, and the $j^{th}$ group of phase-shift feeding networks control the azimuth angles of the beams corresponding to the $j^{th}$ group of antenna bays, so that the azimuth angles of the beams corresponding to the $i^{th}$ group of antenna bays are equal to the azimuth angles of the beams corresponding to the $j^{th}$ group of antenna bays. Therefore, the $i^{th}$ group of antenna bays and the $j^{th}$ group of antenna bays can jointly form a massive MIMO and form corresponding beams.

It should be understood that, in actual application, there may be an error in an azimuth angle of a beam corresponding to each bay. The azimuth angle of the beams corresponding to the $i^{th}$ group of antenna bays may be specifically an average value $\overline{ET_i}$ of azimuth angles of the beams corresponding to all the bays in the $i^{th}$ group of antenna bays, and the azimuth angles of the beams corresponding to the $j^{th}$ group of antenna bays may be specifically an average value $\overline{ET_j}$ of azimuth angles of the beams corresponding to all the bays in the $j^{th}$ group of antenna bays. When the antenna apparatus is in the first state, the $i^{th}$ group of phase-shift feeding networks and the $j^{th}$ group of phase-shift feeding networks may enable $\overline{ET_i}-\overline{ET_j}>0$, and may further enable $|\overline{ET_i}-\overline{ET_j}|>(d_i+d_j)/2$ to avoid interference between beams, where $d_i$ is an average horizontal beam width of the $n_j$ vertical orthogonal beams corresponding to the $i^{th}$ group of antenna bays, and $d_j$ is an average horizontal beam width of the beams corresponding to the $j^{th}$ group of antenna bays.

When the antenna apparatus is in the second state, the $i^{th}$ group of phase-shift feeding networks and the $j^{th}$ group of phase-shift feeding networks may enable $\overline{ET_i}=\overline{ET_j}$.

It should be noted that, generally, a horizontal beam width of a beam refers to an included angle between two directions in which radiated power is reduced by 3 dB on two sides of a maximum radiation direction in a horizontal direction.

Correspondingly, the control apparatus in this application may switch the antenna apparatus from the three-dimensional multi-beam antenna state to the massive MIMO state. The process may specifically include: controlling, by using the $i^{th}$ group of phase-shift feeding networks, the downtilt angles of the beams corresponding to the $i^{th}$ group of antenna bays, and controlling, by using the $j^{th}$ group of phase-shift feeding networks, the downtilt angles of the beams corresponding to the $j^{th}$ group of antenna bays, to enable $\overline{ET_i}=\overline{ET_j}$.

The control apparatus in this application may further switch the antenna apparatus from the massive MIMO state to the three-dimensional multi-beam antenna state. The process may specifically include: controlling, by using the $i^{th}$ group of phase-shift feeding networks, the downtilt angles of the beams corresponding to the $i^{th}$ group of antenna bays, and controlling, by using the $j^{th}$ group of phase-shift feeding networks, the downtilt angles of the beams corresponding to the $j^{th}$ group of antenna bays, to enable $|\overline{ET_i}-\overline{ET_j}|>(d_i+d_j)/2$.

The antenna apparatus in this embodiment of this application may be flexibly switched between the multi-beam antenna state and the MM state based on a service requirement. For example, in a small-packet service scenario, the antenna apparatus may be used as a multi-beam antenna to save resources. In a scenario in which users are not evenly distributed, the antenna apparatus may be used as an MM. In other words, the antenna apparatus in this application may be applicable to a plurality of service scenarios, and has high flexibility.

In addition, the beamforming network 303 in this embodiment of this application includes the $n_i$-driving-$N_i$ multi-beam feeding network 3031, the $N_i$-driving-$N_i$ through feeding network 3032, the $N_i$ first switch circuits 3033, and the $N_i$ second switch circuits 3034. Beam state switching is implemented by using the first switch circuits and the second switch circuits. The implementation is simple and costs are low.

Further, in this embodiment of this application, when S is greater than or equal to 2, the antenna apparatus may be further used as a three-dimensional multi-beam antenna, that is, may switch between a three-dimensional multi-beam antenna state and an MM state, thereby improving flexibility of the solution.

This application further provides another antenna apparatus. The antenna apparatus includes N elements, an n-driving-N multi-beam feeding network, N first switch circuits, an N-driving-N through feeding network, N antenna ports, N second switch circuits, a port correction network corresponding to the N antenna ports, and a correction port corresponding to the port correction network, where N is an integer greater than 4, and n is an integer less than or equal to N. The N elements are arranged to form a rectangle of A rows and B columns, where A is an integer greater than 1, and B is an integer greater than 1.

When the antenna apparatus is in a first state, each of the N elements is connected to one end of each of the N first switch circuits in a one-to-one correspondence, other ends of the N first switch circuits are connected to N input ports corresponding to the n-driving-N multi-beam feeding network, each of n output ports corresponding to the n-driving-N multi-beam feeding network are connected to one end of each of n second switch circuits in a one-to-one correspondence, and other ends of the n second switch circuits are connected to n antenna ports.

When the antenna apparatus is in a second state, each of the N elements is connected to one end of each of the N first switch circuits in a one-to-one correspondence, the other ends of the N first switch circuits are connected, in a one-to-one correspondence, to N input ports corresponding to the N-driving-N through feeding network, each of N output ports corresponding to the N-driving-N through feeding network are connected to one end of each of the N second switch circuits in a one-to-one correspondence, and the other ends of the N second switch circuits are connected to the N antenna ports in a one-to-one correspondence.

The port correction network is configured to couple signals corresponding to the N antenna ports to a correction port. When the antenna apparatus is in the second state, the correction port is connected to a port corresponding to a correction module in a radio frequency system, so that the correction module can correct, based on the signals coupled to the correction port, signals corresponding to the N antenna ports.

Optionally, when the antenna apparatus is in the first state, or when the antenna apparatus is in the second state, the correction port is connected to the port corresponding to the correction module in the radio frequency system, so that the correction module can correct, based on the signals coupled to the correction port, the signals corresponding to the N antenna ports.

Optionally, the N-driving-N through feeding network is bypassed to the n-driving-N multi-beam feeding network.

The antenna apparatus in this embodiment of this application may be flexibly switched between a three-dimensional multi-beam antenna state and an MM state based on a service requirement. For example, in a small-packet service scenario, the antenna apparatus may be used as a three-dimensional multi-beam antenna to save resources. In a scenario in which users are not evenly distributed, the antenna apparatus may be used as an MM. In other words, the antenna apparatus in this application may be applicable to a plurality of service scenarios, and has high flexibility.

This application further provides a communications system. The communications system includes the antenna apparatus according to any one of the embodiments corresponding to FIG. 2A, FIG. 3A and FIG. 3B, FIG. 4A, FIG. 4B, and FIG. 4C, and FIG. 5A and FIG. 5B.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by persons skilled in the art that, for ease and brevity of description, for a specific working process of the method provided in this application, refer to a corresponding process in the foregoing apparatus embodiments, and details are not described herein again.

In the several embodiments provided in this application, it should be understood that the disclosed system, apparatus, and method may be implemented in other manners. For example, the described apparatus embodiments are merely examples. For example, a plurality of components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Some or all of the components may be selected according to actual needs to achieve the objectives of the solutions of the embodiments.

In addition, functional components in the embodiments of this application may be integrated into one processing unit, or each of the components may exist alone physically, or two or more components are integrated into one unit. The integrated unit may be implemented in a form of hardware, or may be implemented in a form of a software functional unit.

When the integrated processing unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An antenna apparatus, comprising S groups of antenna bays, S groups of phase-shift feeding networks, and S beamforming networks, wherein S is an integer greater than or equal to 1;
   wherein an $i^{th}$ group of antenna bays in M groups of the S groups of antenna bays comprise $N_i$ bays, wherein an $i^{th}$ group of phase-shift feeding networks in M groups of the S groups of phase-shift feeding networks comprise $N_i$ phase-shift feeding networks, wherein the $N_i$ bays are connected to the $N_i$ phase-shift feeding networks in a one-to-one correspondence, wherein M is an integer less than or equal to S, wherein i is any integer from 1 to M, and wherein $N_i$ is an integer greater than 1; and
   when the antenna apparatus is in a first state, an $i^{th}$ beamforming network in M beamforming networks of the S beamforming networks is configured to form $n_i$ beams corresponding to the $N_i$ bays, wherein $N_i$ first ports corresponding to the $i^{th}$ beamforming network are connected to the $N_i$ phase-shift feeding networks in a one-to-one correspondence, wherein $n_i$ second ports corresponding to the $i^{th}$ beamforming network are connected to $n_i$ antenna ports in a one-to-one correspondence, and wherein $n_i$ is an integer less than or equal to $N_i$; or
   when the antenna apparatus is in a second state, an $i^{th}$ beamforming network in M beamforming networks of the S beamforming networks is configured to form $N_i$ beams corresponding to the $N_i$ bays, wherein $N_i$ first ports corresponding to the $i^{th}$ beamforming network are connected to the $N_i$ phase-shift feeding networks in a one-to-one correspondence, and wherein $N_i$ second ports corresponding to the $i^{th}$ beamforming network are connected to $N_i$ antenna ports in a one-to-one correspondence.

2. The antenna apparatus according to claim 1, wherein the antenna apparatus further comprises L antenna ports, a port correction network corresponding to the L antenna ports, and a correction port, wherein L is greater than or equal to 1, and wherein the port correction network is configured to couple signals corresponding to the L antenna ports to the correction port.

3. The antenna apparatus according to claim 2, wherein when the antenna apparatus is in the second state, the correction port is connected to a port corresponding to a correction module in a radio frequency system.

4. The antenna apparatus according to claim 2, wherein when the antenna apparatus is in the first state, the correction port is connected to a port corresponding to a correction module in a radio frequency system.

5. The antenna apparatus according to claim 2, wherein the $i^{th}$ beamforming network comprises an $n_i$-driving-$N_i$ multi-beam feeding network, an $N_i$-driving-$N_i$ through feeding network, $N_i$ first switch circuits, and $N_i$ second switch circuits, and wherein:

when the antenna apparatus is in the first state, the $N_i$ phase-shift feeding networks are connected, in a one-to-one correspondence, to $N_i$ first ports corresponding to the $N_i$ first switch circuits, wherein $N_i$ second ports corresponding to the $N_i$ first switch circuits are connected, in a one-to-one correspondence, to $N_i$ first ports corresponding to the $n_i$-driving-$N_i$ multi-beam feeding network, wherein $n_i$ second ports corresponding to the $n_i$driving-$N_i$ multi-beam feeding network are connected, in a one-to-one correspondence, to $n_i$ first ports corresponding to $n_i$ second switch circuits, wherein $n_i$ second ports corresponding to the $n_i$ second switch circuits are connected to $n_i$ antenna ports in a one-to-one correspondence, and wherein the $n_i$-driving-$N_i$ multi-beam feeding network is configured to form $n_i$ orthogonal beams corresponding to the $N_i$ bays; or when the antenna apparatus is in the second state, the $N_i$ phase-shift feeding networks are connected, in a one-to-one correspondence, to $N_i$ first ports corresponding to the $N_i$ first switch circuits, wherein $N_i$ second ports corresponding to the $N_i$ first switch circuits are connected, in a one-to-one correspondence, to $N_i$ first ports corresponding to the $N_i$-driving-$N_i$ through feeding network, wherein $N_i$ second ports corresponding to the $N_i$-driving-$N_i$ through feeding network are connected, in a one-to-one correspondence, to $N_i$ first ports corresponding to the $N_i$ second switch circuits, $N_i$ second ports corresponding to the $N_i$ second switch circuits are connected to the $N_i$ antenna ports in a one-to-one correspondence, and wherein the $N_i$ antenna ports are connected to the port correction network, wherein the $N_i$-driving-$N_i$ through feeding network is configured to form $N_i$ through beams corresponding to the $N_i$ bays.

6. The antenna apparatus according to claim 5, wherein the $N_i$-driving-$N_i$ through feeding network is bypassed to the $n_i$-driving-$N_i$ multi-beam feeding network.

7. The antenna apparatus according to claim 1, wherein S is greater than or equal to 2, wherein a $j^{th}$ group of antenna bays in the S groups of antenna bays comprise $N_j$ bays, wherein a $j^{th}$ group of phase-shift feeding networks comprise $N_j$ phase-shift feeding networks, wherein the $N_j$ bays are connected to the $N_j$ phase-shift feeding networks in a one-to-one correspondence, wherein $N_j$ is an integer greater than or equal to 1;

wherein the $i^{th}$ group of phase-shift feeding networks are configured to control downtilt angles of beams corresponding to the $i^{th}$ group of antenna bays, wherein a downtilt angle of a beam corresponding to each bay in the $i^{th}$ group of antenna bays is within a first preset range;

wherein the $j^{th}$ group of phase-shift feeding networks are configured to control downtilt angles of beams corresponding to the $j^{th}$ group of antenna bays, wherein a downtilt angle of a beam corresponding to each bay in the $j^{th}$ group of antenna bays is within a second preset range; and wherein the downtilt angle is an azimuth angle or a pitch angle.

8. The antenna apparatus according to claim 7, wherein:
when the antenna apparatus is in the first state, $|\overline{ET_i} - \overline{ET_j}| > (d_i + d_j)/2$, wherein $\overline{ET_i}$ is an average value of downtilt angles of beams corresponding to the $N_i$ bays in the $i^{th}$ group of antenna bays, wherein $\overline{ET_j}$ is an average value of downtilt angles of beams corresponding to the $N_j$ bays in the $j^{th}$ group of antenna bays, wherein $d_i$ is an average beam width of $n_i$ beams corresponding to the $i^{th}$ group of antenna bays, and wherein $d_j$ is an average beam width of the beams corresponding to the $j^{th}$ group of antenna bays.

9. The antenna apparatus according to claim 7, wherein:
when the antenna apparatus is in the second state, $\overline{ET_i} = \overline{ET_j}$, wherein $\overline{ET_i}$ is an average value of downtilt angles of beams corresponding to the $N_i$ bays in the $i^{th}$ group of antenna bays, and wherein $\overline{ET_j}$ is an average value of downtilt angles of beams corresponding to the $N_j$ bays in the $j^{th}$ group of antenna bays.

10. A beam state switching method, wherein the method is applied to an antenna apparatus, wherein the antenna apparatus comprises S groups of antenna bays, S groups of phase-shift feeding networks, and S beamforming networks, wherein S is an integer greater than or equal to 1;

wherein an $i^{th}$ group of antenna bays in M groups of the S groups of antenna bays comprise $N_i$ bays, wherein an $i^{th}$ group of phase-shift feeding networks in M groups of the S groups of phase-shift feeding networks comprise $N_i$ phase-shift feeding networks, wherein the $N_i$ bays are connected to the $N_i$ phase-shift feeding networks in a one-to-one correspondence, wherein M is an integer less than or equal to S, wherein i is any integer from 1 to M, and wherein $N_i$ is an integer greater than or equal to 1;

when the antenna apparatus is in a first state, an $i^{th}$ beamforming network in M beamforming networks of the S beamforming networks is configured to form $n_i$ beams corresponding to the $N_i$ bays, wherein $N_i$ first ports corresponding to the $i^{th}$ beamforming network are connected to the $N_i$ phase-shift feeding networks in a one-to-one correspondence, wherein $n_i$ second ports corresponding to the $i^{th}$ beamforming network are connected to $n_i$ antenna ports in a one-to-one correspondence, wherein $n_i$ is an integer less than or equal to $N_i$; or when the antenna apparatus is in a second state, an $i^{th}$ beamforming network in M beamforming networks of the S beamforming networks is configured to form $N_i$ beams corresponding to the $N_i$ bays, wherein $N_i$ first ports corresponding to the $i^{th}$ beamforming network are connected to the $N_i$ phase-shift feeding networks in a one-to-one correspondence, and wherein $N_i$ second ports corresponding to the $i^{th}$ beamforming network are connected to $N_i$ antenna ports in a one-to-one correspondence; and wherein the method comprises:
receiving, by a control apparatus, a switching instruction; and
switching, by the control apparatus and based on the switching instruction, the antenna apparatus from the first state to the second state, or switching the antenna apparatus from the second state to the first state, wherein the first state is a multi-beam antenna state, and wherein the second state is a massive MIMO (NM) state.

11. The method according to claim 10, wherein the antenna apparatus further comprises L antenna ports, a port correction network corresponding to the L antenna ports, and a correction port, wherein L is greater than or equal to 1, and wherein the port correction network is configured to couple signals corresponding to the L antenna ports to the correction port.

12. The method according to claim 11, wherein:
when the antenna apparatus is in the second state, the correction port is connected to a port corresponding to a correction module in a radio frequency system; or when the antenna apparatus is in the first state, the correction port is connected to a port corresponding to a correction module in a radio frequency system.

13. The method according to claim 11, wherein the $i^{th}$ beamforming network comprises an $n_i$-driving-$N_i$ multi-beam feeding network, an $N_i$-driving-$N_i$ through feeding network, $N_i$ first switch circuits, and $N_i$ second switch circuits, wherein the $N_i$ phase-shift feeding networks are connected, in a one-to-one correspondence, to $N_i$ first ports corresponding to the $N_i$ first switch circuits;

wherein the switching, by the control apparatus and based on the switching instruction, the antenna apparatus from the second state to the first state comprises:
controlling, by the control apparatus and based on the switching instruction, the $N_i$ first switch circuits and $n_i$ second switch circuits in the $N_i$ second switch circuits, wherein $N_i$ second ports corresponding to the $N_i$ first switch circuits are connected, in a one-to-one correspondence, to $N_i$ first ports corresponding to the $n_i$-driving-$N_i$ multi-beam feeding network, wherein $n_i$ first ports corresponding to the $n_i$ second switch circuits are connected, in a one-to-one correspondence, to $n_i$ second ports corresponding to the $n_i$-driving-$N_i$ multi-beam feeding network, and wherein $n_i$ second ports corresponding to the $n_i$ second switch circuits are connected to $n_i$ antenna ports in a one-to-one correspondence; and wherein the switching, by the control apparatus and based on the switching instruction, the antenna apparatus from the first state to the second state comprises:
controlling, by the control apparatus and based on the switching instruction, the $N_i$ first switch circuits and the $N_i$ second switch circuits, wherein $N_i$ second ports corresponding to the $N_i$ first switch circuits are connected, in a one-to-one correspondence, to $N_i$ first ports corresponding to the $N_i$-driving-$N_i$ through feeding network, wherein $N_i$ first ports corresponding to the $N_i$ second switch circuits are connected, in a one-to-one correspondence, to $N_i$ second ports corresponding to the $N_i$-driving-$N_i$ through feeding network, wherein $N_i$ second ports corresponding to the $N_i$ second switch circuits are connected to $N_i$ antenna ports in a one-to-one correspondence, and wherein the $N_i$ antenna ports are connected to the port correction network.

14. The method according to claim 10, wherein S is greater than or equal to 2;
wherein a $j^{th}$ group of antenna bays in the S groups of antenna bays comprise $N_j$ bays, wherein a $j^{th}$ group of phase-shift feeding networks comprise $N_j$ phase-shift feeding networks, wherein the $N_j$ bays are connected to the $N_j$ phase-shift feeding networks in a one-to-one correspondence, wherein $N_j$ is an integer greater than or equal to 1; and wherein the switching, by the control apparatus and based on the switching instruction, the antenna apparatus from the first state to the second state comprises:
controlling, by the control apparatus, the $N_i$ phase-shift feeding networks in the $i^{th}$ group of phase-shift feeding networks and the $N_j$ phase-shift feeding networks in the $j^{th}$ group of phase-shift feeding networks, wherein a downtilt angle of a beam corresponding to each bay in the $i^{th}$ group of antenna bays is within a first preset range, wherein a downtilt angle of a beam corresponding to each bay in the $j^{th}$ group of antenna bays is within a second preset range, wherein $\overline{ET_i}=\overline{ET_j}$, wherein $\overline{ET_i}$ is an average value of downtilt angles of beams corresponding to the $N_i$ bays in the $i^{th}$ group of antenna bays, and wherein $\overline{ET_j}$ is an average value of downtilt angles of beams corresponding to the $N_j$ bays in the $j^{th}$ group of antenna bays.

15. The method according to claim 10, wherein the first state is a three-dimensional multi-beam antenna state, and wherein S is greater than or equal to 2;
wherein a $j^{th}$ group of antenna bays in the S groups of antenna bays comprise $N_j$ bays, wherein a $j^{th}$ group of phase-shift feeding networks comprise $N_j$ phase-shift feeding networks, wherein the $N_j$ bays are connected to the $N_j$ phase-shift feeding networks in a one-to-one correspondence, wherein $N_j$ is an integer greater than or equal to 1; and wherein the switching, by the control apparatus and based on the switching instruction, a beam state corresponding to the antenna apparatus from the second state to the first state comprises:
controlling, by the control apparatus, the $N_i$ phase-shift feeding networks in the $i^{th}$ group of phase-shift feeding networks and the $N_j$ phase-shift feeding networks in the $j^{th}$ group of phase-shift feeding networks, wherein a downtilt angle of a beam corresponding to each bay in the $i^{th}$ group of antenna bays is within a first preset range, wherein a downtilt angle of a beam corresponding to each bay in the $j^{th}$ group of antenna bays is within a second preset range, wherein $|\overline{ET_i}-\overline{ET_j}|>(d_i+d_j)/2$, wherein $\overline{ET_i}$ is an average value of downtilt angles of beams corresponding to the $N_i$ bays in the $i^{th}$ group of antenna bays, wherein $\overline{ET_j}$ is an average value of downtilt angles of beams corresponding to the $N_j$ bays in the $j^{th}$ group of antenna bays, wherein $d_i$ is an average beam width of $n_i$ beams corresponding to the $i^{th}$ group of antenna bays, wherein $d_j$ is an average beam width of beams corresponding to the $j^{th}$ group of antenna bays, and wherein the downtilt angle is an azimuth angle or a pitch angle.

16. A communications system, comprising an antenna apparatus, wherein the antenna apparatus comprises S groups of antenna bays, S groups of phase-shift feeding networks, and S beamforming networks, wherein S is an integer greater than or equal to 1;
wherein an $i^{th}$ group of antenna bays in M groups of the S groups of antenna bays comprise $N_i$ bays, wherein an $i^{th}$ group of phase-shift feeding networks in M groups of the S groups of phase-shift feeding networks comprise $N_i$ phase-shift feeding networks, wherein the $N_i$ bays are connected to the $N_i$ phase-shift feeding networks in a one-to-one correspondence, wherein M is an integer less than or equal to S, wherein i is any integer from 1 to M, and wherein $N_i$ is an integer greater than 1; and when the antenna apparatus is in a first state, an $i^{th}$ beamforming network in M beamforming networks of the S beamforming networks is configured to form $n_i$ beams corresponding to the $N_i$ bays, wherein $N_i$ first ports corresponding to the $i^{th}$ beamforming network are connected to the $N_i$ phase-shift feeding networks in a one-to-one correspondence, wherein $n_i$ second ports corresponding to the $i^{th}$ beamforming network are connected to $n_i$ antenna ports in a one-to-one correspondence, and wherein $n_i$ is an integer less than or equal to $N_i$; or when the antenna apparatus is in a second state, an $i^{th}$ beamforming network in M beamforming networks of the S beamforming networks is configured to form $N_i$ beams corresponding to the $N_i$ bays, wherein $N_i$ first ports corresponding to the $i^{th}$ beamforming network are connected to the $N_i$ phase-shift feeding networks in a one-to-one correspondence, and wherein $N_i$ second ports corresponding to the $i^{th}$ beamforming network are connected to $N_i$ antenna ports in a one-to-one correspondence.

* * * * *